US007656276B2

United States Patent

(12) Takahashi et al.

(10) Patent No.: US 7,656,276 B2

(45) Date of Patent: Feb. 2, 2010

(54) NOTIFICATION CONTROL DEVICE, ITS SYSTEM, ITS METHOD, ITS PROGRAM, RECORDING MEDIUM STORING THE PROGRAM, AND TRAVEL SUPPORT DEVICE

(75) Inventors: Kazuya Takahashi, Kawasaki (JP); Motoji Hashimoto, Tokyo (JP); Fumio Isozaki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1120 days.

(21) Appl. No.: 11/016,883

(22) Filed: Dec. 21, 2004

(65) Prior Publication Data

US 2005/0195092 A1 Sep. 8, 2005

(30) Foreign Application Priority Data

Dec. 24, 2003 (JP) ............................ 2003-427509
Dec. 24, 2003 (JP) ............................ 2003-427510

(51) Int. Cl.
*G08B 3/00* (2006.01)

(52) U.S. Cl. .................... 340/384.1; 340/506; 340/500; 340/691.1; 340/692; 340/825.25

(58) Field of Classification Search .............. 340/384.1, 340/506, 500, 691.1, 691.3, 692, 825.25, 340/759, 762
See application file for complete search history.

(56) References Cited

U.S. PATENT DOCUMENTS 4,359,713 A 11/1982 Tsunoda ...................... 340/52
2004/0151326 A1* 8/2004 Nishimura et al. ......... 381/71.2

FOREIGN PATENT DOCUMENTS

EP 1 370 115 A2 12/2003

(Continued)

OTHER PUBLICATIONS

European Search Report dated Jan. 19, 2006.

(Continued)

*Primary Examiner*—Daryl Pope
(74) *Attorney, Agent, or Firm*—Kratz, Quintos & Hanson, LLP

(57) ABSTRACT

The travel situation of a vehicle is detected by sensors and a sensor section 110 recognizes the moving state of the vehicle and outputs event signals. A processing section 180 has a sound emission control section that acquires a MIDI message to be used for notifying the travel situation by means of a MIDI sound source generating section. At the same time, it recognizes the priority level of the event signal to be used for notification in terms of urgency or significance and defines the parameter value of the MIDI message so as to bring the localized sound image of the sound to be emitted from a speaker located substantially at the center relative to a driver according to the priority level. Then, it has a sound emitting section 150 emit the sound. When a plurality of travel situations are to be notified, the localized sound images of the sounds to be notified are differentiated according to the priority levels of the travel situations in terms of urgency or significance so that the driver can easily judge the urgency or the significance of each moving state. Thus, the driver can behave appropriately in response to the travel situations.

111 Claims, 15 Drawing Sheets

FOREIGN PATENT DOCUMENTS

| | | |
|---|---|---|
| JP | 3-114000 | 5/1991 |
| JP | 03-159500 | 7/1991 |
| JP | 5-126948 | 5/1993 |
| JP | 7-203581 | 8/1995 |
| JP | 9-090963 | 4/1997 |
| JP | 9-121400 | 5/1997 |
| JP | 9-171085 | 6/1997 |
| JP | 9-185390 | 7/1997 |
| JP | 9-211158 | 8/1997 |
| JP | 9-238391 | 9/1997 |
| JP | 10-197669 | 7/1998 |
| JP | 10-332854 | 12/1998 |
| JP | 11-127495 | 5/1999 |
| JP | 11-164384 | 6/1999 |
| JP | 11-234784 | 8/1999 |
| JP | 11-305767 | 11/1999 |
| JP | 2000-29462 | 1/2000 |
| JP | 2000-36993 | 2/2000 |
| JP | 2002-204492 | 7/2002 |
| JP | 2002-304187 | 10/2002 |
| JP | 2002-354573 | 12/2002 |
| JP | 2002-374599 | 12/2002 |
| WO | WO 03/001885 A2 | 1/2003 |

OTHER PUBLICATIONS

Office Action corresponding to Japanese patent application No. 2003-427509 on Oct. 7, 2008 -Notification of Reason(s) for Refusal.

Office Action dated Sep. 29, 2009 issued for the relevant Japanese patent application No. 2003-427510 with English translation.

* cited by examiner

FIG. 3

| | |
|---|---|
| CATEGORY 1 | CHANNEL VOICE MESSAGE |
| CATEGORY 2 | CONTROL CHANGE cc#10 |
| FORMAT | Bn 0A dM (Bn 2A dL) |
| n | MIDI CHANNEL 1～16 (0～FH) |
| 0A | CONTROL NUMBER 10 |
| dM | MSB LEFT 0(00H)～CENTER 64(40H)～RIGHT 127(7FH) |

FIG. 4

| | |
|---|---|
| CATEGORY 1 | CHANNEL VOICE MESSAGE |
| CATEGORY 2 | CONTROL CHANGE cc#7 |
| FORMAT | Bn 07 dM (Bn 27 dL) |
| n | MIDI CHANNEL 1～16(0～FH) |
| 7 | CONTROL NUMBER 7 |
| dM | MSB 0(00H)～127(7FH) |

FIG.6

| | |
|---|---|
| CATEGORY 1 | CHANNEL VOICE MESSAGE |
| CATEGORY 2 | CONTROL CHANGE cc#73 |
| FORMAT | Bn 49 dd |
| n | MIDI CHANNEL 1~16 (0~FH) |
| 49 | CONTROL NUMBER 73 (SOUND CONTROLLER 4) |
| dd | 0<FAST>~64 (40H) INITIAL VALUE~127 (7FH)<SLOW> |

FIG. 7

| | |
|---|---|
| CATEGORY 1 | CHANNEL VOICE MESSAGE |
| CATEGORY 2 | CONTROL CHANGE cc#98, cc#99 |
| FORMAT | Bn 63 <MSB> Bn 62 <LSB> |
| n | MIDI CHANNEL 1~16 (0~FH) |
| 63 | NRPN MSB (CONTROL NUMBER 99) |
| MSB | PARAMETER NUMBER MSB |
| 62 | NRPN LSB (CONTROL NUMBER 98) |
| LSB | PARAMETER NUMBER LSB |

FIG. 8

| | |
|---|---|
| CATEGORY 1 | CHANNEL VOICE MESSAGE |
| CATEGORY 2 | CONTROL CHANGE cc#6, cc#38 |
| FORMAT | Bn 06 <MSB> Bn 26 <LSB> |
| n | MIDI CHANNEL 1～16(0～FH) |
| 6 | CONTROL NUMBER 6 |
| MSB | |
| 26 | CONTROL NUMBER 38 |
| LSB | |

FIG.9

| | |
|---|---|
| CATEGORY 1 | CHANNEL VOICE MESSAGE |
| CATEGORY 2 | CONTROL CHANGE cc#11 |
| FORMAT | Bn 0B dM (Bn 2B dL) |
| n | MIDI CHANNEL 1~16 (0~FH) |
| 0B | CONTROL NUMBER 11 |
| dM | MSB 0 (00H)~127 (7FH) |

FIG. 10

| | |
|---|---|
| CATEGORY 1 | CHANNEL VOICE MESSAGE |
| CATEGORY 2 | CONTROL CHANGE cc#72 |
| FORMAT | Bn 48 dd |
| Bn | MIDI CHANNEL 1～16(0～FH) |
| 48 | CONTROL NUMBER 72 (SOUND CONTROLLER 3) |
| dd | 0<FAST>～64(40H) INITIAL VALUE～127(7FH)<SLOW> |

FIG. 11

| | |
|---|---|
| CATEGORY | CHANNEL VOICE MESSAGE |
| FORMAT | 9n <note> 00 |
| n | MIDI CHANNEL 1～16 (0～FH) |
| note | NOTE NUMBER 0～127 (00H～7FH) |
| vel | 0 FIXED |

FIG. 12

| CATEGORY | CHANNEL VOICE MESSAGE |
|---|---|
| FORMAT | 8n <note> <vel> |
| n | MIDI CHANNEL 1~16 (0~FH) |
| note | NOTE NUMBER 0~127 (00H~7FH) |
| vel | OFF VELOCITY 0 (00H)~127 (7FH) |

FIG.13

| | |
|---|---|
| CATEGORY | CHANNEL VOICE MESSAGE |
| FORMAT | 9n <note> <vel> |
| n | MIDI CHANNEL 1~16 (0~FH) |
| note | NOTE NUMBER 0~127 (00H~7FH) |
| vel | VELOCITY 1 (01H)~127 (7FH) |

NOTIFICATION CONTROL DEVICE, ITS SYSTEM, ITS METHOD, ITS PROGRAM, RECORDING MEDIUM STORING THE PROGRAM, AND TRAVEL SUPPORT DEVICE

BACKGROUND OF THE INVENTION

1. Field of the Invention

The present invention relates to a notification control device for notifying the situation of an event by controlling characteristics of a sound emitted from a speaker, its system, its method, its program, a recording medium storing the program, and a travel support device.

2. Description of Related Art

Art for modifying characteristics of a sound emitted from a speaker to notify an event has been known. It includes various known configurations such as an alarm clock adapted to control an alarm sound emitted from a speaker by, for example, increasing the volume of the alarm sound or changing the alarm sound from an intermittent sound to a continuous sound as a predetermined time, which may be a waking time, approaches. Reference 1: Japanese Patent Laid-Open Publication No. Hei. 9-211158 and Reference 2: Japanese Patent Laid-Open Publication No. Hei. 10-332854 discloses such techniques.

More specifically, Reference 1 discloses an arrangement adapted to selectively modify the base current and the collector current of a transistor for amplifying the electric current applied to a speaker by adding an external circuit to a voice synthesizing IC for outputting an alarm sound and controlling all the resistance from the input terminal to the output terminal of the externally added circuit by means of the voice synthesizing IC. Then, the volume of the alarm sound is changed by selectively changing the base current and the collector current of the transistor by means of the externally added circuit.

Reference 2 discloses an arrangement adapted to select one of a plurality of different waveforms for the drive voltage applied to a motor from a drive voltage waveform generating section capable of outputting the plurality of drive voltage waveforms by using a switching section. Then, the motor is driven by a predetermined drive voltage waveform at a preset time so as to control the output form, i.e., the sounding form of an alarm sound of an alarm sound generating section for generating the alarm sound.

However, with the arrangements of above-described References 1 and 2 for changing the volume of the alarm sound and changing the sounding form of the alarm sound, the position of the source of the sound that is heard and recognized at a user position does not change and, for example, it is difficult to judge the urgency or the significance of the sound notification simply by hearing the sound. Particularly, if different notifications are given from a plurality of sound sources, it will be difficult for the user to judge which notification is most urgent or significant.

Additionally, if different notifications, e.g., an alarm for gas leakage and an alarm of an alarm clock, are given simultaneously, it is difficult for the user to judge which of the notifications is more urgent or significant. Then, the user may not be able to respond appropriately to the notifications.

SUMMARY OF THE INVENTION

An object of the present invention to provide a notification control device that allows a user to judge the situation of an event notified by a sound with ease, a notification control system, its method, its program, a recording medium storing the program, and a travel support device.

(Notification Control Device/Single Event/Sound Image Localization)

A notification control device according to the present invention is designed as described below in order to make the user able to judge the current situation of an event when the event takes place alone.

A notification control device according to the present invention is for notifying the situation of an event by controlling characteristics of a sound emitted from a speaker based on the event and has a control section for controlling the inclination from the start of sound emission to the highest sound pressure level of the envelope of the sound pressure level from the start to the end of emission of the sound from the speaker so as to make it show a steep gradient as the priority level of notifying the situation of the input event becomes higher based on the event signal representing the priority level of notification of the situation of the event.

With the above defined arrangement, if the speaker is mounted in a vehicle, the alarm sound emitted from the speaker is heard by a driver as if the localized sound image is approaching relative to the driver as the priority level of urgency or significance of the travel situation of the vehicle being notified becomes higher so that the driver is forced to be more attentive to the travel situation of the vehicle being notified and hence more carefully recognizes the travel situation so that he or she can easily judge the travel situation of the vehicle.

A notification control device according to the present invention may be so arranged as to have a control section for modifying either the time from the start of sound emission to the highest sound pressure level of the envelope of the sound pressure level from the start to the end of emission of the sound from the speaker or the sound pressure level corresponding to the event signal corresponding to the situation of the input event.

A notification control device according to the present invention may be so arranged as to have an event signal acquiring section for acquiring an event signal corresponding to the situation of the event, a sound information generating section for generating sound information to be emitted from the speaker and a sound emission control section for modifying the time and the sound pressure level of the sound information in the region from the start of sound emission to the highest sound pressure level of the envelope of the sound pressure level from the start to the end of emission of the sound from the speaker corresponding to the acquired event signal.

With the above defined arrangement, if the speaker is mounted in a vehicle, the alarm sound emitted from the speaker is heard by a driver as if the localized sound image is approaching relative to the driver as the priority level of urgency or significance of the travel situation of the vehicle being notified becomes higher so that the driver is forced to be more attentive to the travel situation of the vehicle being notified and hence more carefully recognizes the travel situation so that he or she can easily judge the travel situation of the vehicle.

A notification control device according to the present invention may be so arranged as to have an event signal acquiring section for acquiring an event signal corresponding to the situation of the event and a sound information generating section for generating sound information to be emitted from the speaker, defining information on the time and the sound pressure level in the region from the start of sound emission to the highest sound pressure level of the envelope of the sound pressure level from the start to the end of emission of the sound from the speaker corresponding to the acquired event signal.

With the above defined arrangement, information on the time and the sound pressure level in the region from the start of sound emission to the highest sound pressure level of the envelope of the sound pressure level from the start to the end of emission of the sound from the speaker is defined depending on the event signal corresponding to the travel situation of the vehicle and sound information to be emitted from the speaker is generated. Therefore, if the speaker is mounted in a vehicle, the sound information is heard by a driver as if the localized sound image is approaching relative to the driver as the priority level of urgency or significance of the travel situation of the vehicle being notified becomes higher so that the driver is forced to be more attentive to the travel situation of the vehicle being notified and hence more carefully recognizes the travel situation so that he or she can easily judge the travel situation of the vehicle.

A notification control device according to the present invention may be so arranged as to have a control section for controlling so as to relatively raise the ratio of the direct sound to the reflected sound reaching a reference point due to the emission of sound by the speaker as the priority level becomes higher based on the event signal representing the priority level of notifying the situation of the input event.

With the above defined arrangement, if the speaker is mounted in a vehicle, the ratio of the direct sound to the reflected sound reaching the driver who operates as reference point for mounting the speaker around the driver due to the emission of sound by the speaker rises as the priority level of notification becomes higher based on the event signal representing the priority level of notifying the travel situation of the vehicle. As a result, the driver perceives as if the localized sound image is approaching relative to the driver as the priority level of urgency or significance of the travel situation of the vehicle being notified increases so that the driver is forced to be more attentive to the travel situation of the vehicle being notified and hence more carefully recognizes the travel situation so that he or she can easily judge the travel situation of the vehicle.

(Notification Control Device/Plurality of Events/Sound Image Localization)

A notification control device according to the present invention is designed as described below in order to be able to judge the current situations of a plurality of events when such a number of events take place simultaneously.

A notification control device according to the present invention is for notifying the situations of a plurality of different events by controlling characteristics of a sound emitted from a speaker arranged around a reference point based on the events and has a control section for controlling notification so as to bring the localized sound image for the event having the highest priority level of notification closest relative to the reference point in terms of relative distance based on a plurality of event signals representing the priority levels of notification of the situations of the input events.

With the above defined arrangement, the characteristics of the emitted sound are so controlled that the sound image localization for the event having the highest priority level for notification is notified at the closest position relative to the driver based on the plurality of event signals representing respectively the priority levels of notification in terms of urgency or significance of the travel situation of the vehicle. Thus, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty.

A notification control device according to the present invention may be so arranged as to have a control section for controlling the sounds emitted from the speaker so as to bring the localized sound image of an event having a higher priority level of notification closer relative to the reference point based on a plurality of event signals representing respectively the priority levels of notification of the situations of the input events.

With the above defined arrangement, the characteristics of the emitted sounds are so controlled as to bring the localized sound image of an event having a higher priority level of notification closer relative to the driver based on a plurality of event signals representing respectively the priority levels of notification of the travel situations in terms of urgency or significance. Thus, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty.

A notification control device according to the present invention may be so arranged as to have an event signal acquiring section for acquiring a plurality of event signals corresponding to the situations of the events, a sound information generating section for generating sound information to be emitted from the speaker and a sound emission control section for recognizing the priority level of each of the acquired plurality of event signals and controlling the sounds emitted from the speaker so as to bring the localized sound image of an event having a higher priority level closer relative to the reference point.

A notification control device according to the present invention may be so arranged as to have an event signal acquiring section for acquiring a plurality of event signals corresponding to the situations of the events and a sound information generating section for recognizing the priority level of each of the plurality of event signals and generating the sound information, defining information relating to sound image localizations so as to bring the localized sound image of an event having a higher priority level closer relative to the reference point for the sound information emitted from the speaker.

With the above defined arrangement, sound information such as MIDI message is generated by defining parameter values relating to sound image localizations such those relating to as the Panpots (panning potentiometers) and the channel volumes so as to bring the localized sound image of an event having a higher priority level of notification closer relative to the driver based on a plurality of event signals representing respectively the priority levels of notification of the travel situations in terms of urgency or significance. Thus, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty.

(Notification Control Device/Plurality of Events/Steep Gradient of Envelope)

A notification control device according to the present invention may be so arranged as to have an event signal acquiring section adapted to acquire a plurality of event signals corresponding to the situations of the events, a sound information generating section for generating sound information to be emitted from the speaker and a sound emission control section for recognizing the priority level of each of the acquired plurality of event signals and controlling the time and the sound pressure level from the start of sound emission to the highest sound pressure level so as to make the inclination from the start of sound emission to the highest sound pressure level of the envelope of the sound pressure level from the start to the end of sound emission from the speaker show a steep gradient as the priority level becomes higher.

With the above defined arrangement, the time and the sound pressure level from the start of sound emission to the highest sound pressure level are controlled so as to make the inclination from the start of sound emission to the highest sound pressure level of the envelope of the sound pressure level from the start to the end of sound emission from the speaker show a steep gradient as the priority level becomes higher based on a plurality of event signals representing respectively the priority levels of notification of the travel situations in terms of urgency or significance. Thus, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty.

(Notification Control Device/Plurality of Events/Reflected Sound and Direct Sound)

A notification control device according to the present invention may be so arranged as to have a control section for controlling so as to relatively raise the ratio of the direct sound to the reflected sound reaching a reference point due to the emission of sound by the speaker as the priority level of notification becomes higher based on the event signals representing respectively the priority levels of notifying the situations of the input events.

With the above-defined arrangement, the ratio of the direct sound to the reflected sound reaching the driver who operates as reference point for mounting the speaker around the driver due to the emission of sound by the speaker is raised as the priority level of notification becomes higher based on the event signals representing respectively the priority levels of notifying the travel situations of the vehicle. Thus, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty.

(Travel Support Device)

In another aspect of the present invention, there is provided a travel support device for supporting the travel of a mobile body by notifying the travel situation of the mobile body based on map information, the device having a travel situation acquiring section for acquiring information on the travel situation on the travel of the mobile body and a notification control device according to the present invention for notifying a guidance relating to the travel as the situation of an event by emitting a sound for it from a speaker based on the information on the situation.

In still another aspect of the present invention, there is provided a notification control system having a plurality of event situation detecting sections for detecting the situations of events and outputting event signals corresponding to the situations of events, a priority level judging section for judging the priority level of each of the events based on the event signals and the above-described notification control device or a travel support device according to the present invention for notifying the situations of events by controlling the characteristics of the sound emitted from a speaker based on the judged priority levels.

With either of the above-defined arrangements, the travel support device operates to notify information on the travel situation of a vehicle as the situation of an event. Thus, particularly the one adapted to notify the travel situation of the vehicle for which a number of events take place in a complex way so that the driver can satisfactorily judge the priority level of the travel situation without influencing the travel of the vehicle and hence the driver can drive the vehicle in a satisfactory manner.

(Notification Control Method/Single Event)

In still another aspect of the present invention, there is provided a notification control method of notifying the situation of an event by controlling the characteristics of the sound emitted from a speaker by an operating section based on the event, the method comprising the steps of controlling the inclination from the start of sound emission to the highest sound pressure level of the envelope of the sound pressure level from the start to the end of emission of the sound from the speaker so as to make it show a steep gradient as the priority level of notifying the situation of the input event becomes higher based on the event signal representing the priority level of notification of the situation of the event.

A notification control method according to the present invention may be so arranged as to include the steps of modifying the time from the start of sound emission to the highest sound pressure level of the envelope of the sound pressure level from the start to the end of emission of the sound from the speaker and the sound pressure level corresponding to the event signal corresponding to the situation of the input event.

A notification control method according to the present invention may be so arranged as to include the steps of acquiring an event signal corresponding to the situation of the event and modifying the time and the sound pressure level of sound information to be emitted from the speaker in the region from the start of sound emission to the highest sound pressure level of the envelope of the sound pressure level from the start to the end of emission of the sound from the speaker corresponding to the acquired event signal.

A notification control method according to the present invention may be so arranged as to include the steps of acquiring an event signal corresponding to the situation of the event, generating sound information to be emitted from the speaker, defining information on the time and the sound pressure level in the region from the start of sound emission to the highest sound pressure level of the envelope of the sound pressure level from the start to the end of emission of the sound from the speaker, and emitting the generated sound information from the speaker.

A notification control method according to the present invention may be so arranged as to have the operating section control so as to raise the ratio of the direct sound to the reflected sound reaching a reference point due to the emission of sound by the speaker as the priority level of notification becomes higher based on the event signal representing the priority level of notifying the situation of the input event.

(Notification Control Method/Plurality of Events)

In still another aspect of the present invention, there is provided a notification control method of notifying the situations of a plurality of events by controlling characteristics of a sound emitted from speaker arranged around a reference point by an operating section based on the events, the operating section controlling notification so as to bring the localized sound image for the event having the highest priority level of notification closest relative to the reference point in terms of relative distance based on a plurality of event signals representing the priority level of notification of the situations of the input events.

A notification control method according to the present invention may be so arranged as to have the operating section control so as to bring the localized sound image of an event having a higher priority level of notification closer relative to the reference point based on a plurality of event signals representing respectively the priority levels of notification of the situations of the input events.

A notification control method according to the present invention may be so arranged as to have the operating section control so as to process the sound information in order to bring the localized sound image of an event having a higher priority level of notification closer relative to the reference point based on a plurality of event signals representing respectively the priority levels of notification of the situations of the input events and have the sound information emitted from the speaker.

A notification control method according to the present invention may be so arranged as to have the operating section recognize the priority level of each of the plurality of different event signals corresponding to the situations of the events and generate the sound information to be emitted from the speaker so as to bring the localized sound image having a higher priority level closer relative to the reference point.

A notification control method according to the present invention may be so arranged as to have the operating section recognize the priority level of each of the plurality of different event signals corresponding to the situations of the events and control the time from the start of sound emission to the highest sound pressure level and the sound pressure level in a state where the inclination from the start of sound emission to the highest sound pressure level of the envelope of the sound pressure level from the start to the end of emission of the sound from the speaker is made to show a steep gradient as the priority level becomes higher.

A notification control method according to the present invention may be so arranged as to have the operating section control so as to relatively raise the ratio of the direct sound to the reflected sound reaching a reference point due to the emission of sound by speaker as the priority level of notification becomes higher based on the event signals representing the priority levels of notifying the situations of the input events.

BRIEF DESCRIPTION OF THE DRAWINGS

FIG. 3 is a conceptual illustration of the data structure of a MIDI message for controlling of moving the movement of a localized sound image of the embodiment;

FIG. 4 is a conceptual illustration of the data structure of a MIDI message for controlling of moving the depth of a localized sound image of the embodiment;

FIG. 6 is a conceptual illustration of the data structure of a MIDI message for the attack time controlled so as to thin a localized sound image of the embodiment;

FIG. 7 is a conceptual illustration of the data structure of a MIDI message equivalent to an attack time that is controlled so as to thin a localized sound image of the embodiment;

FIG. 8 is a conceptual illustration of the data structure of the data entry of a MIDI message for controlling of thinning a localized sound image of the embodiment;

FIG. 9 is a conceptual illustration of the data structure of a MIDI message equivalent to an attack time that is controlled so as to thin a localized sound image of the embodiment;

FIG. 10 is a conceptual illustration of the data structure of a MIDI message relating to a release time that is controlled so as to thin a localized sound image of the embodiment;

FIG. 11 is a conceptual illustration of the data structure of a MIDI message relating to note off that is controlled so as to temporarily erase a localized sound image of the embodiment;

FIG. 12 is a conceptual illustration of the data structure of a MIDI message relating to off velocity that is controlled so as to temporarily erase a localized sound image of the embodiment;

FIG. 13 is a conceptual illustration of the data structure of a MIDI message relating to restoration of a sound image that is controlled so as to temporarily erase a localized sound image of the embodiment;

DETAILED DESCRIPTION OF PREFERRED EMBODIMENTS

Now, an embodiment of the present invention will be described by referring to the accompanying drawings. This embodiment describes a navigation device, which is a guiding device as a travel support device according to the present invention, for guiding a mobile body such as a vehicle, using the travel situations, or the moving conditions, of the vehicle as the situations of events. However, a guiding device according to the present invention is not limited to a device adapted to guide a moving vehicle but may be a device adapted to notify the state of the vehicle or the moving conditions of the vehicle or provide guidance for the travel of the vehicle and may be applicable to a portable unit carried by a user. Additionally, a travel support device according to the present invention is not limited to such a guiding device and may be applicable to an apparatus adapted to notify the situations of various events by emitting sounds from speakers, such as an alarm clock and an alarm device for a manufacturing apparatus.

[Configuration of Navigation Device]

Figure 1:
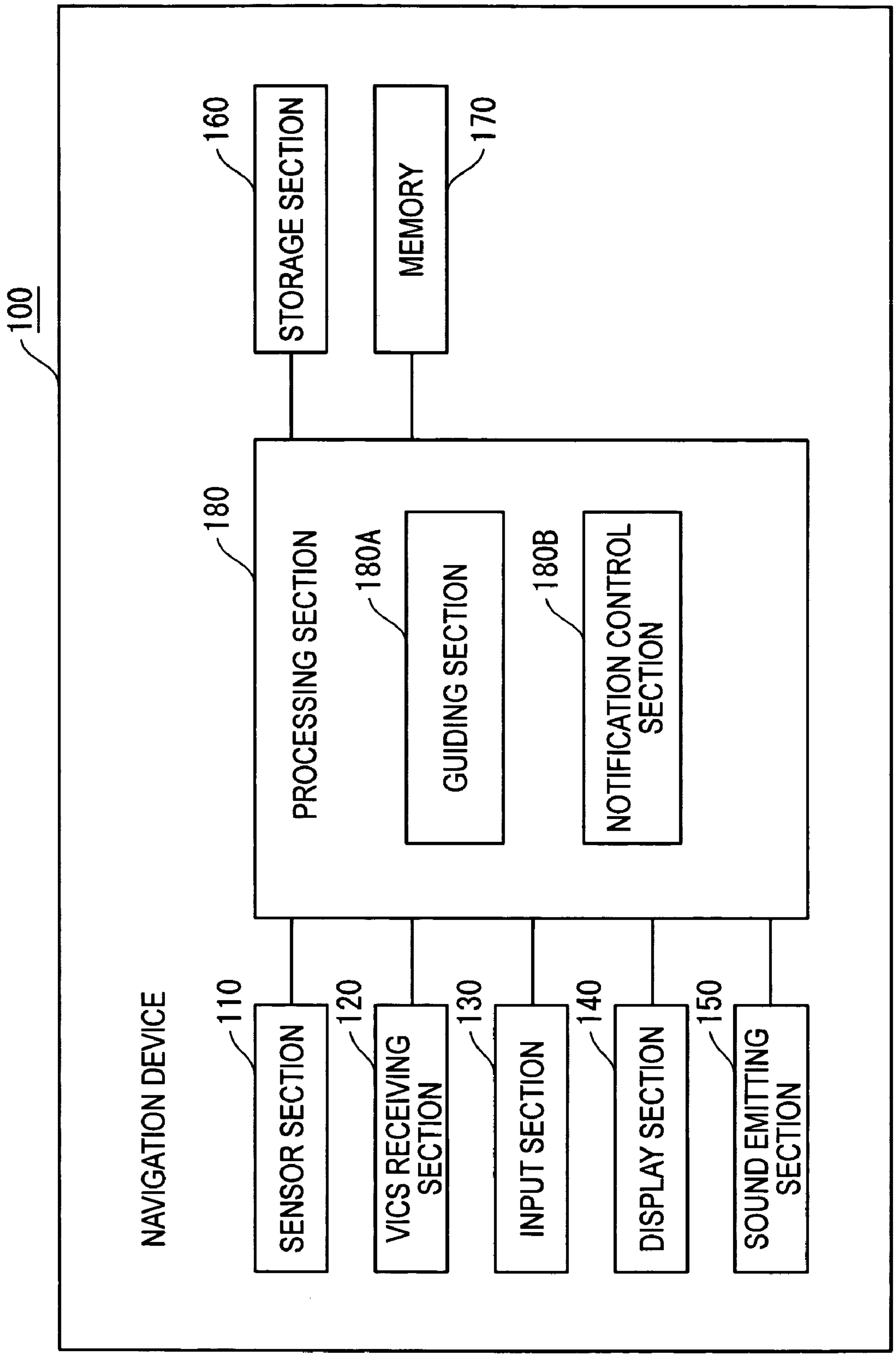
FIG. 1 is a schematic block diagram illustrating the configuration of a navigation device as a travel support device according to an embodiment of the present invention.

FIG. 1 is a schematic block diagram illustrating the configuration of a navigation device according to an embodiment of the present invention. In FIG. 1, reference symbol 100 denotes a navigation device, which is a guiding device as a travel support device. The navigation device 100 provides guidance for the travel of a mobile body such as a vehicle corresponding to the travel situation of the vehicle. The mobile body is not limited to a vehicle but may be an aircraft, a ship or some other mobile body. The navigation device 100 may be of an in-vehicle unit installed in a vehicle, a portable unit, a PDA (Personal Digital Assistant), a mobile phone, a PHS (Personal Handyphone System) or a portable personal computer.

The navigation device 100 is supplied with power from a battery that is mounted in vehicle and displays information on the current position and the destination, searches for and displays the route to the destination or retrieves and displays a predetermined store located nearby with the services that the store provides. The navigation device 100 has a sensor section 110 that operates as a travel situation acquiring section and an event signal acquiring section, a VICS (Vehicle Information Communication System) receiving section 120 that operates as a traffic information acquiring section, an input section 130, a display section 140, a sound emitting section 150, a storage section 160, a memory 170 and a processing section 180 that is a control section operates as an operating section or a notification control device.

The sensor section 110 detects the travel situations of the vehicle such as the current position and the moving conditions of the vehicle and outputs them to the processing section 180 as a predetermined signal. The sensor section 110 has a GPS (Global Positioning System) receiving section (not shown) and various sensors including a speed sensor (not shown), an azimuth sensor and an acceleration sensor for detecting events and output them as event signals.

The GPS receiving section of the sensor section 110 receives the navigation electric wave output from a relevant one of the GPS satellites, which are artificial satellites, via an antenna (not shown). Then, the GPS receiving section computes the pseudo-coordinate values of the current position according to the signal corresponding to the received navigation electric wave and outputs them to the processing section 180 as GPS data.

The speed sensor of the sensor section 110, which is a sensor arranged typically in the vehicle, detects the moving speed and the actual acceleration of the vehicle according to the signal that changes in response to the moving speed, or the travel speed, of the vehicle. The speed sensor typically reads the pulse signal and the voltage value output as a result of the revolutions of the axles or the wheels of the vehicle. Then, the speed sensor appropriately outputs the pulse signal and the voltage value it reads to the processing section 180 as event signals. The azimuth sensor, which is a sensor also typically arranged in the vehicle, has a so-called gyro sensor (not shown) and detects the azimuth of the vehicle or the direction in which the vehicle is moving. The azimuth sensor appropriately outputs the event signal representing the information on the detected moving direction to the processing section 180. The acceleration sensor, which is a sensor also typically mounted in the vehicle, detects the acceleration of the vehicle for the moving direction thereof. The acceleration sensor appropriately outputs to the processing section 180 the event signal representing the information on the pulse or voltage obtained by converting the detected acceleration into an output value. The sensor section 110 recognizes the situations of the travel of the vehicle according to the detection signals output from the various sensors including a sensor for detecting the fuel level, a sensor for detecting the distance between the vehicle and the vehicle moving immediately ahead, a sensor for detecting the distance from the vehicle to the obstruction located behind, a sensor for detecting the temperature of the engine that is an internal combustion engine and sensors for detecting the readiness for being turned on of various lamps and appropriately outputs the event signals representing the situations of the respective events to the processing section 180.

The VICS receiving section 120 has a VICS antenna (not shown) and acquires traffic information by way of the VICS antenna. More specifically, the VICS receiving section 120 acquires traffic information on congestions, traffic accidents, construction works, traffic controls and so on (to be referred to as VICS data hereinafter) by way of a beacon or FM multiplex broadcasting, typically utilizing an antenna section. Then, the VICS receiving section 120 outputs the acquired traffic information to the processing section 180 as a predetermined signal.

The input section 130 typically includes a keyboard and a mouse and has various operation buttons (not shown) and operation knobs for input operations. The operation buttons and the operation knobs are operated typically for selecting operations of the navigation device 100. More specifically, they are operated to define the contents of the information to be acquired and the conditions for acquiring the information, select the destination, retrieve information, cause the moving conditions, or the travel situations, of the vehicle to display, switch the image being displayed, modify the sound emitting conditions and/or select the timing of providing guidance for driving the vehicle. The input section 130 appropriately outputs a predetermined signal to the processing section 180 in response to the input operation for a specified item so as to have the processing section 180 operate appropriately. The input section 130 may have a touch panel arranged at the display section 140, a voice input arrangement and/or an arrangement for outputting signals via a wireless medium such as a remote controller for input operations in place of the operation buttons and the operation knobs for input operations. In short, the input section 130 may have any arrangement adapted to selectively input various items.

The display section 140 is controlled by the processing section 180 to display the image of the signal of the image data from the processing section 180 on the display screen thereof. Image data that can be used for displaying images on the display screen include image data such as map information and other retrieved information as well as TV image data received by a TV receiving set (not shown), image data recorded on a recording medium of an external device such as an optical disk, a magnetic disk or a memory card and read by a drive or a driver and image data from the memory 170. The display section 140 may be a liquid crystal display panel, an organic EL (Electro Luminescence) panel, a PDP (Plasma Display Panel), a CRT (Cathode-Ray Tube), a FED (Field Emission Display) or an electrophoretic display panel.

The sound emitting section 150 typically includes a speaker and an amplifier (not shown). The sound emitting section 150 emits sound information coming from the processing section 180 as sound under the control of the processing section 180. As a result of sound emission, it notifies the driver and the passenger(s) of the travel situation of the vehicle including the moving direction, the traffic conditions and so on. The sound emitting section 150 can output the sound received by the TV receiving set and the sound and music recorded in a recording medium, which may be the memory 170. A separating sound emitting section may be provided for the sound emitting section 150 or the speaker and the amplifier that are already provided in the vehicle may alternatively be used to operate as the sound emitting section 150.

The storage section 160 readably stores retrieval information necessary for acquiring map information, information on particular geographical spots, personal information of the user and so on. The storage section 160 may be a drive or a driver adapted to readably stores data in a recording medium such as a HD (Hard Disk), a DVD (Digital Versatile Disc), an optical disk or a memory card.

The memory 170 readably stores items defined by operating the input section 130 as input operations as well as pieces of music, images and various sounds output from the processing section 180. The memory 170 also stores various programs that are to be spread on the OS (operating system) that controls the entire operation of the navigation device 100. Preferably, the memory 170 is, for example, a CMOS (Complementary Metal-Oxide Semiconductor) memory that retains its memory in case of a sudden failure of power supply such as blackout. The memory 170 may include a drive or driver adapted to readably store data in a recording medium such as a HD, a DVD or an optical disc.

The processing section 180 is connected to various input/output ports (not shown) such as a VICS reception port to which the VICS antenna is connected, a GPS reception port to which the GPS receiving section is connected, sensor ports to which various sensors are respectively connected, a key input port to which the input section 130 is connected, a display control port to which the display section 140 is connected, a sound emission control port to which the sound emitting section 150 is connected, a storage port to which the storage section 160 is connected and a memory port to which the memory 170 is connected. The processing section 180 has a guiding section 180A that appropriately acquires various pieces of information and processes them by means of any of the programs stored in the memory 170 in order to provide guidance for the travel of the vehicle and a notification control section 180B that operates as notification control device for controlling the emission of various sounds from the speaker of the sound emitting section 150.

Now, the internal configuration of the processing section 180 will be described by referring to the related drawings.

Figure 2:
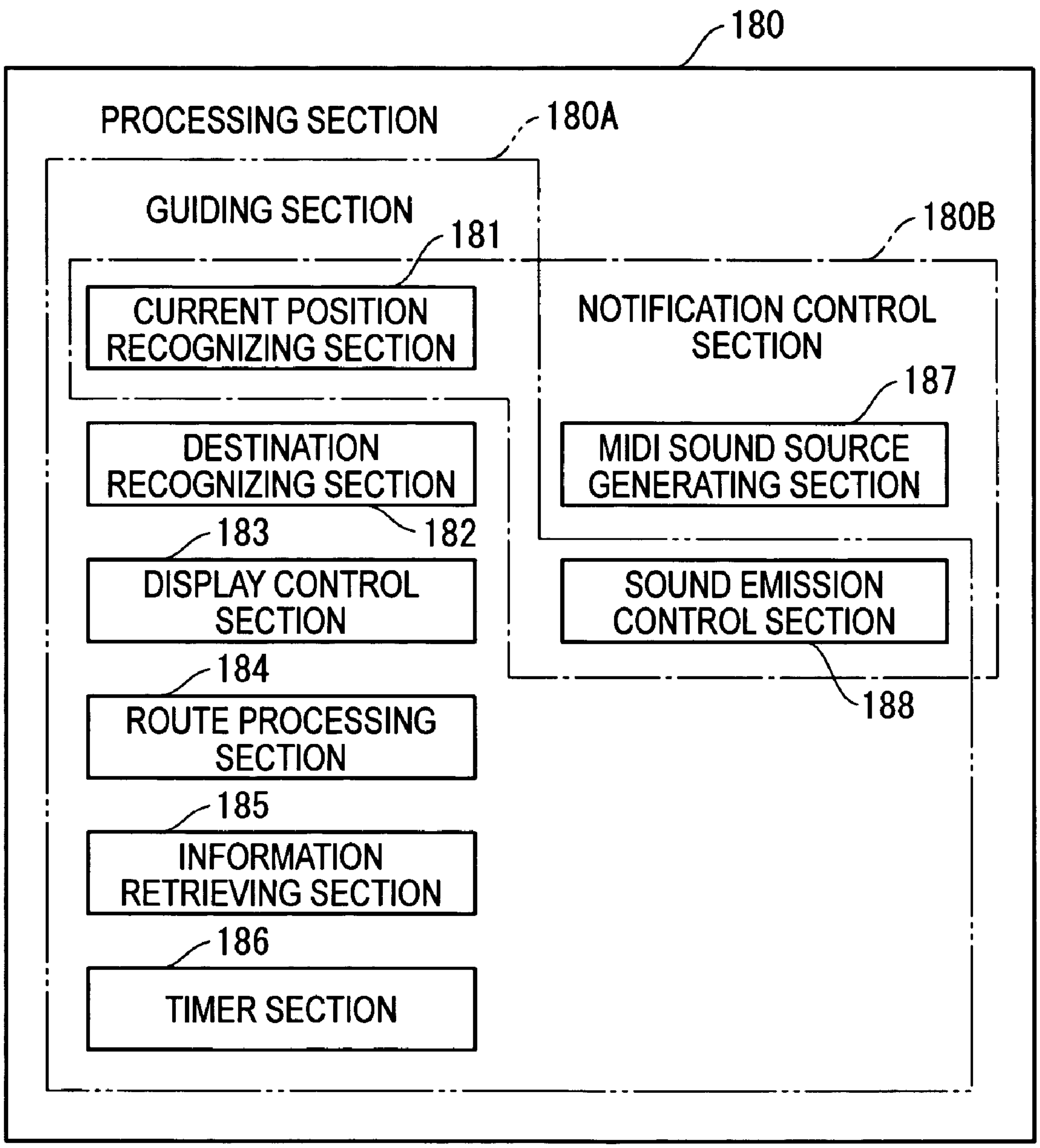
FIG. 2 is a schematic block diagram of a processing section of the embodiment.
Figure 5:
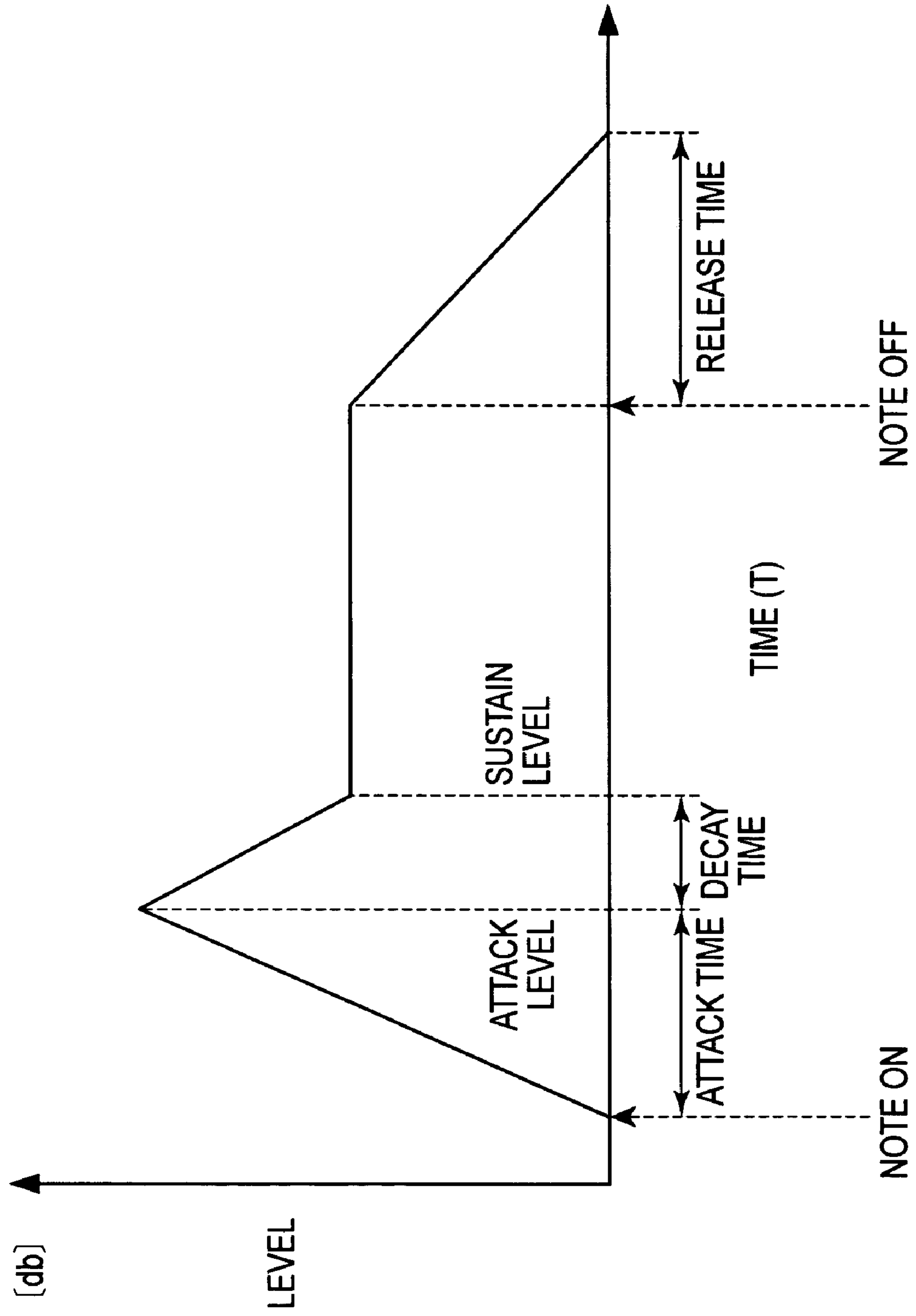
FIG. 5 is a graph of an envelope formed by the emission of an alarm sound controlled so as to thin a localized sound image of the embodiment.

FIG. 2 is a schematic block diagram of the processing section. FIG. 3 is a conceptual illustration of the data structure of a MIDI message for controlling of moving a localized sound image. FIG. 4 is a conceptual illustration of the data structure of a MIDI message for controlling of moving the depth of a localized sound image. FIG. 5 is a graph of an envelope formed by the emission of an alarm sound. FIG. 6 is a conceptual illustration of the data structure of a MIDI message for the attack time controlled so as to thin a localized sound image. FIG. 7 is a conceptual illustration of the data structure of a MIDI message equivalent to an attack time that is controlled so as to thin a localized sound image. FIG. 8 is a conceptual illustration of the data structure of the data entry of a MIDI message for controlling of thinning a localized sound image. FIG. 9 is a conceptual illustration of the data structure of a MIDI message equivalent to the processing of an attack time that is controlled so as to thin a localized sound image. FIG. 10 is a conceptual illustration of the data structure of a MIDI message relating to a release time that is controlled so as to thin a localized sound image. FIG. 11 is a conceptual illustration of the data structure of a MIDI message relating to note off that is controlled so as to temporarily erase a localized sound image. FIG. 12 is a conceptual illustration of the data structure of a MIDI message relating to off velocity that is controlled so as to temporarily erase a localized sound image. FIG. 13 is a conceptual illustration of the data structure of a MIDI message relating to restoration of a sound image that is controlled so as to temporarily erase a localized sound image.

As illustrated in FIG. 2, the processing section 180 has a current position recognizing section 181 that is a current position information acquiring section as a travel situation acquiring section and an event signal acquiring section, a destination recognizing section 182 that is a destination information acquiring section, a display control section 183, a route processing section 184, an information retrieving section 185, a timer section 186, a MIDI (Musical Instrument Digital Interface) sound source generating section 187 and a sound emission control section 188. All these sections are realized by various programs. The guiding section 180A is constituted by the current position recognizing section 181, the destination recognizing section 182, the display control section 183, the route processing section 184, the information retrieving section 185, the timer section 186 and the sound emission control section 188. The notification control section 180B is constituted by the current position recognizing section 181, the MIDI sound source generating section 187 and the sound emission control section 188.

The current position recognizing section 181 recognizes the current position of the vehicle as the travel situation of the vehicle. More specifically, it computes a plurality of pseudo-current-positions of the vehicle on the basis of the speed data and the azimuth data of the vehicle that are output respectively from the speed sensor and the azimuth sensor of the sensor section 110. Additionally, the current position recognizing section 181 recognizes the pseudo-current-position value of the vehicle on the basis of the GPS data relating to the current position of the vehicle output from the GPS receiving section of the sensor section 110. Then, the current position recognizing section 181 computationally determines the current position of the vehicle on a map, which is acquired separately, by comparing the computed pseudo-current-positions and the recognized pseudo-current-position and recognizes the current position of the vehicle.

Additionally, the current position recognizing section 181 judges the inclination and the height difference of the road on which the vehicle is currently moving on the basis of the acceleration data output from the acceleration sensor and computationally determines the pseudo-current-position of the vehicle. Then, it recognizes the current position of the vehicle. Thus, it can accurately recognize the current position of the vehicle if the vehicle is at a position where roads overlap on a plane such as a multi-level-crossing, which may be that of highways. Additionally, it can accurately recognize the current position by correcting the difference between the distance of travel of the vehicle obtained from speed data and azimuth data and the actual moving distance of the moving vehicle, using the inclination of the road and other detected data even when the vehicle is moving on a mountain road or some other slope.

The current position recognizing section 181 can recognize the starting point that is specified and input by the input section 130 and other positions as pseudo-current-positions in addition to the above-described current-position of the vehicle. The various pieces of information acquired by the current position recognizing section 181 are appropriately stored in the memory 170.

The destination recognizing section 182 acquires information on the destination that typically is specified and input by the input section 130 and recognizes the position of the destination. Various pieces of information may be selected, input and used as information on the destination such as the coordinate values in terms of longitude and latitude, the address, the telephone number and so on that can be used to identify the position of the destination. The information on the destination as recognized by the destination recognizing section 182 is appropriately stored in the memory 170.

The display control section 183 notifies the user of various pieces of information by displaying them on the display screen of the display section 140, controlling the display section 140. The display control section 183 also controls the display section 140 so as to display various images for prompting the user to select and input various pieces of information by operating the input section 130.

The route processing section 184 searches for the moving route, or the travel route, of the vehicle on the basis of the information on the specified items for searching for the travel route as selected and input by the user and the map information stored in the storage section 160. More specifically, the route processing section 184 searches for roads that can be used for the vehicle to move, utilizing the map information according to the specified and input items, and generates travel route information on the route that requires the least travel time to get to the destination and/or on the shortest route to get to the destination. It may alternatively be so arranged that, for example, the route processing section 184 appropriately acquires VICS data from the VICS that are output from the VICS receiving section 120, generates traffic jam information on the traffic jams that are currently taking place or expected to take place a predetermined period of time after from now and defines a route that avoids the traffic jams and other spots under traffic control when generating the travel route information. The route processing section 184 can determine the predicted required travel time for each of the candidate travel routes when that route is selected to get to the destination from the current position and generate required time information on the predicted required travel time. The obtained travel route information is appropriately stored in the memory 170 along with the traffic jam information and the predicted required time information.

The information retrieving section 185 retrieves the information on a predetermined spot on the map that is stored in the storage section 160 in response to a retrieval request for retrieving the information that is specified and input by way of the input section 130 and acquires the information that corresponds to the retrieval request. The information that is acquired as a result of the retrieval is appropriately stored in the memory 170.

The timer section 186 typically recognizes the current time on the basis the reference pulse of an internal clock, for instance. Then, the timer section 186 appropriately outputs the recognized time information on the current time.

The MIDI sound source generating section 187 generates sound information such as MIDI messages that conforms to a MIDI Standard provided by the MMA (MIDI Manufacturers Association) of the United States and the JMSC (Japan MIDI Standards Committee), the GM (General MIDI) Standard, the GS (General Standard) Standard, the XG (Extended General MIDI) Standard or the GM Level 2 Standard. Then, the MIDI sound source generating section 187 directly generates sound information or acquires and outputs the sound information stored in advance in the memory 170 in response to a signal requesting the sound information to be output. The sound information to be notified may be an alarm sound for drawing attention when outputting a voice for travel guidance or any of different pieces of sound information with different tones and sound patterns representing different events, which include the fuel level, the temperature of the engine, the distance between the vehicle and the vehicle moving immediately ahead and the distance from the vehicle to the obstruction located behind.

The sound emission control section 188 recognizes the travel situation of the vehicle on the basis of the current position recognized by the current position recognizing section 181 and the map and causes the sound emitting section 150 to emit a sound for guiding the travel of the vehicle and supporting the driver for driving vehicle on the basis of the natural feature guidance information on the natural features relating to both the travel route and the map. More specifically, it may cause the sound emitting section 150 to emit an alarm sound and subsequently a voice saying "Turn right at XX intersection 700 meters ahead toward YY.", "You are out of the travel route." or "There is a traffic jam ahead.", which sentences are stored in advance in the storage section 160 or the memory 170 as sound information. The sound emission control section 188 acquires an event signal representing the fuel level, an event signal representing the temperature of the engine, an event signal representing the distance between the vehicle and the vehicle moving immediately ahead and/or an event signal representing the distance from the vehicle to the obstruction located behind that are output from the sensor section 110 for the travel situation of the vehicle so as to recognize the travel situation of the vehicle. Then, the sound emission control section 188 causes the sound emitting section 150 to emit an alarm sound according to the situation of the event that is taking place or each of the events that are taking place. When emitting a sound, the sound emission control section 188 controls the MIDI sound source generating section 187 so as to have it output any of different pieces of sound information with different tones and sound patterns representing different items to be notified, which include the fuel level, the temperature of the engine, the distance between the vehicle and the vehicle moving immediately ahead and the distance from the vehicle to the obstruction located behind and the sound information may be an alarm sound that is emitted at the time of providing guidance.

When notifying a plurality of travel situations, the sound emission control section 188 controls the sound emitting operation in such way that the sound having the highest priority among different sound emitting situations is heard at the position of the driver, which operates as reference point, as if it were emitted from a point closest to the driver in terms of relative distance. More specifically, the sound emission control section 188 performs the control operation by appropriately combining control of the characteristics of sounds whose localized sound images move when sounds are emitted, control of the characteristics of sounds whose depth of localized sound images moves and control of the characteristics of sounds whose localized sound images are thinned.

More specifically, when each emitted piece of sound information is a MIDI message conforming to the MIDI Standard, the parameter of the Panpot, or the value of format dM at address cc#10, of the control change, which is the lower layer of the channel voice message in the table structure of the acquired MIDI message is appropriately defined as shown in FIG. 3. For example, a sound message having a higher priority level of urgency or significance is put into a state where its localized sound image is located right in front of the diver and made to have a value around "90", while a sound message having a lower priority level is put into a state where its localized sound image is shifted to the right or left side of the driver and made to have a value close to "127" when the localized sound image is located at a right side position from the center or "0" when the localized sound image is located at a left side position from the center. In other words, since the driver seat is located at the right side relative to the center of the vehicle in the case of a right-hand-drive car (at the left side in the case of a left-hand-drive car), a value of "90" is selected so as to be at the right side of the substantial center of which value of format dM is "64" (a value around "30" is selected in the case of a left-hand-drive car). If a sound message of which localized sound image is located substantially at the center relative to the driver is given to the driver and thereafter an event signal of a higher priority level is acquired, the localized sound image of the former sound message is shifted to the right side or the left side and that of the latter sound image having a higher priority level is brought substantially to the center. While a parameter value is so selected to move a localized sound image to the left side or the right side in this description, it is also possible to move a localized sound image upward or downward by appropriately selecting a parameter value.

The sound pressure level of a sound emitted from a speaker may be relatively increased or decreased to control the shift of the depth of a localized sound image. For example, when each emitted piece of sound information is a MIDI message conforming to the MIDI Standard, the channel volume is changed and the parameter of the volume, or the value of format dM at address cc#7, of the control change of the acquired MIDI message is appropriately defined as shown in FIG. 4. More specifically, the value of format dM is changed to a value close to 127 so as to make the localized sound image of a sound message having a higher priority level of urgency or significance to be heard at a position close to the driver. The difference between any two localized sound images becomes more distinct by combining this method of moving the depth of a localized sound image and the above-described method of moving the localized sound image.

The relationship between the attack time that defines the inclination of the envelope of the sound pressure level from the start to the end of a piece of sound information emitted from a speaker from the start of sound emission (note on) to the highest sound pressure level and the attack level that is the highest sound pressure level is controlled as shown in FIG. 5 to control the thinning of the existence of a localized sound image. In other words, the characteristics of the emitted sound are controlled in such a way that the inclination of the envelope in the region from the start of sound emission to the highest sound pressure level is made mild when the priority level is low. With this arrangement, a localized sound image having a lower priority level is thinned.

The distance perception of the driver that is the distance between a localized sound image and the driver is differentiated by the ratio of the direct sound to the reflected sound. The ratio of the direct sound relative to the reflected sound rises when the sound source is near so that the sound rises up fast and is heard clearly, whereas the ratio falls when the sound source is far away because the reflected sound rises as the emitted sound is reflected by air and other obstacles so that the sound becomes blurred. Because of this phenomenon, any person listening to the sounds perceives as if the localized sound image were moving by changing the ratio of the direct sound relative to the reflected sound. Therefore, as the ratio of the direct sound increases and the sound rises up rapidly, the sound source is perceived to be approaching and the person listening to the sounds pays more attention to the sounds. When the conception of echo is utilized to control the change of the ratio of the direct sound relative to the reflected sound and a sound is emitted as a clear sound or a blurred sound, it is possible to achieve an effect, or a sound expression, similar to that of changing the ratio of the direct sound relative to the reflected sound so that the localized sound image is perceived as if it were moving. The expression of a clear sound or a blurred sound can be obtained by appropriately controlling and changing the profile of the envelope.

If a MIDI message conforming to the XG Standard or the GM Level 2 Standard is used, the control method will be such that the value of format dd at address cc#73 of the control change is gradually shifted from 0 toward 127 as shown in FIG. 6. If a MIDI message conforming to the GS Standards is used, a NRPN (Non-Registered Parameter Number) will be specified. More specifically, as shown in FIG. 7, the parameter to be operated is identified by means of NRPN MSB (Most Significant Bit) that is the upper order number of the non-registered parameter and NRPN LSB (Least Significant Bit) that is the lower order number and a value to be selected is defined by using the data entries of the LSB and the MSB as shown in FIG. 8. To be more particular, it is possible to establish a state where the attack time is delayed by selecting "I" and "99" respectively as cc#99 for the MSB and as cc#98 for the LSB of the parameter value NRPN shown in FIG. 7 and making an arrangement for shifting the value of cc#6 of the data entry to approach 127. Additionally, as a method of achieving an effect similar to that of changing the attack time as perceived by the auditory sense, the format "cc# 11" for expressing the control change is changed as substitute parameter conforming to the GS Standard as shown in FIG. 9. In other words, the period of time to be defined stepwise at the maximum sound pressure level in the bar graph expression is extended. Additionally, a thinning effect can be achieved by selecting appropriate values respectively for the parameter of velocity and the parameter of expression of the MIDI message.

Preferably, in the envelope shown in FIG. 5, the inclination from the note off that is the command for stopping the sound emission and the point where the sound pressure level substantially comes to 0 to terminate the sound emission is so controlled as to be made mild. In the envelope of FIG. 5, the range from the attack level to the sustain level corresponds to the decay time and the sound pressure level in the range of the decay time corresponds to the decay level. Normally, minimum decay level is the sustain level. In this way, the sound emission control section 188 controls the relationship between the value of the release time and that of the sustain level that is the minimum decay level of the envelope of FIG. 5. More specifically, in the case of a MIDI message conforming to the XG standard or the GM Level 2 Standard, for example, the value of a format "dd" at address cc#72 of the control change, which is the lower layer of the channel voice message in the table structure of the acquired MIDI message, is modified so as to gradually approach 127 from 0 as shown in FIG. 10. On the other hand, as shown in FIGS. 7 and 8, in the case of a MIDI message conforming to the GS Standard, "1" and "102" are selected respectively as cc#99 for the MSB and as cc#98 for the LSB of NRPN and making an arrangement for shifting the value of cc#6 of the data entry to approach 127 as in the case of the attack time.

The difference between any localized sound images becomes clearer by combining the control method of thinning the existence of a localized sound image and at least either the control method of shifting a localized sound image or the control method of changing the depth of a localized sound image.

For thinning a localized sound image, the notification having a lower priority level may be temporarily erased so that the event having the highest priority level may be notified. A localized sound image can be erased temporarily by selecting a parameter for note off of the channel voice message of a MIDI message as shown in FIG. 11 or by selecting "0" for the value of off velocity, which is the parameter for erasing the channel voice message as shown in FIG. 12. When two or more than two sounds are no longer emitted simultaneously as notifications, the sound that is emitted but temporarily erased can be restored by restoring the value of velocity, which is the parameter for defining the intensity of the channel voice message of a MIDI message, that is stored in advance.

[Operation of Navigation Device]

Figure 14:
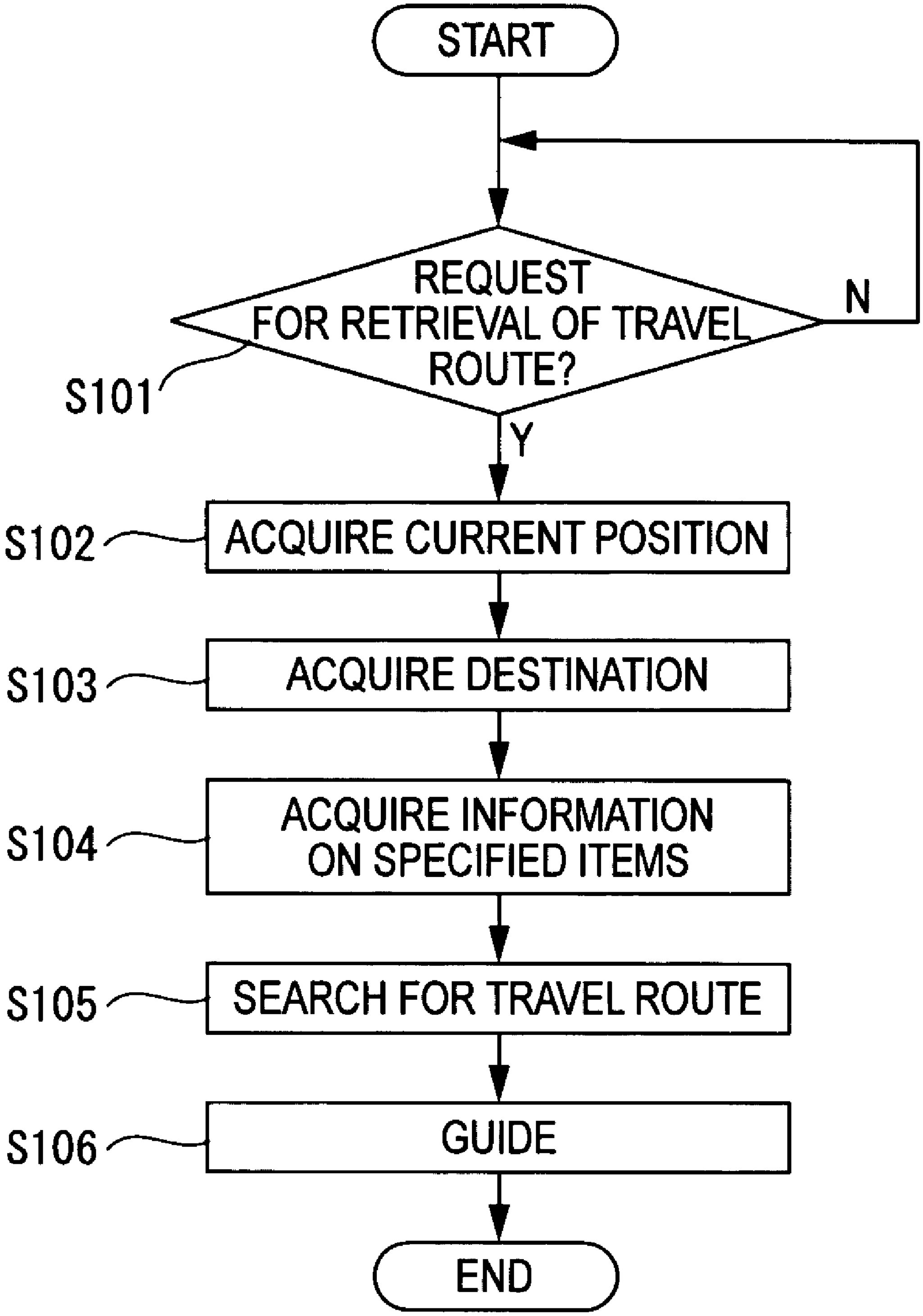
FIG. 14 is a flowchart of the processing for searching for travel routes of the navigation device of the embodiment.

Now, the operation of the navigation device 100 will be described by referring to the related drawings. FIG. 14 is a flowchart of the processing for searching for travel routes of the navigation device 100.

Firstly, the user of the navigation device 100 in the vehicle turns on the power source to supply power to the navigation device 100. As power is supplied to the navigation device 100, the processing section 180 controls the display section 140 so as to cause the latter to display a main menu, which prompts the user to input a command necessary to operate the navigation device 100.

Then, the user operates the input section 130, seeing the displayed image. For example, the user may input a command for searching for the travel route of the vehicle (Step S101). As the command is input, the processing section 180 causes the display control section 183 to display an image on the display section 140 that prompts the user to input data, which typically indicates the destination of the vehicle to which the shortest travel distance, the shortest travel time and/or traffic jam information may or may not be added. Then, the processing section 180 recognizes various pieces of information that are necessary for searching for the travel route of the vehicle by means of the route processing section 184. Thereafter, firstly the processing section 180 operates the current position recognizing section 181 to recognize the current position (Step S102) and then the destination recognizing section 182 to recognize the destination input by the user (Step S103).

More specifically, the processing section 180 operates the current position recognizing section 181 to acquire the information on current position by computing the current position of the vehicle on the basis of the speed data and the azimuth data of the vehicle output respectively from the speed sensor and the azimuth sensor of the sensor section 110 and the GPS data relating to the current position output from the GPS receiving section. The acquired information on the current position is appropriately stored in the memory 170. Additionally, the processing section 180 controls the display section 140 by way of the display control section 183 so as to cause it to display an image that prompts the user to specify and input the destination by operating the input section 130. Then, as the user specifies and inputs the destination by operating the input section 130 in response to the displayed image, the destination recognizing section 182 acquirers destination information on the specified input destination. The acquired destination information is appropriately stored in the memory 170. Note that the user may retrieve map information on the destination by way of the information retrieving section 185 or specify the destination by moving the cursor on the map that is being displayed.

Additionally, the processing section 180 controls the display section 140 by way of the display control section 183 so as to cause it to display an image that prompts the user to specify and input items as requirements for searching for the travel route. Then, the user specifies and inputs items by operating the input section 130 according to the displayed image that prompts the user to specify and input items, the processing section 180 acquirers information on the specified items that are specified and input (Step S104). The acquired information on the specified items is appropriately stored in the memory 170.

Thereafter, the processing section 180 acquirers the information on the specified items that are stored in the memory 170 by way of the route processing section 184 and also the VICS data output from the VICS receiving section 120 in order to search for the travel route from the current position of the vehicle to the destination by using the map stored in the storage section 160 (Step S105). In this processing of searching for the travel route, the route processing section 184 acquires a plurality of candidate travel routes and reduces the number of candidate travel routes to only a few by way of a computation, using the information on the specified items and the traffic jam information acquired appropriately. Then, the processing section 180 controls the display section 140 by the display control section 183 so as to cause it to display the computationally obtained candidate travel routes, five candidate travel routes for instance, and also an image that prompts the user to select one of the candidate travel routes. Thus, the final travel route is specified as the user selects and inputs one of the candidate travel routes in response to the displayed image that prompts the user to do so. If there is only one candidate travel route as a result of the computation, there will be no image that prompts the user to select and input one of them and the only candidate travel route is automatically specified as the final travel route. It may alternatively be so arranged that only a single candidate travel route that optimally meets the requirements of the information on the specified items is displayed and the user is prompted to acknowledge it without displaying a plurality of candidate travel routes and prompting the user to selects one of them.

Then, the processing section 180 controls the display section 140 by the display control section 183 to cause it to appropriately display the map stored in the storage section 160 in order to guide the user (Step S106). For this guiding operation, the processing section 180 also displays by superimposition the travel route with an icon indicating the current position of the vehicle and information on the traffic conditions of the travel route such as the traffic jams that are taking place on the travel route.

Thereafter, the processing section 180 recognizes the travel situation of the vehicle on the basis of the signals output from the speed sensor, the azimuth sensor and the acceleration sensor of the sensor section 110 and the GPS data output from the GPS receiving section. Additionally, the processing section 180 controls the display section 140 by the display control section 183 so as to cause it to display guidance for the travel of the vehicle and also the sound emitting section 150 by the sound emission control section 188 so as to cause it to emit a voice or an alarm sound in order to provide sound guidance for the travel of the vehicle on the basis of the recognized travel situation and the route guidance information contained in the information on the travel route.

When the sound emitting section 150 is operated to notify a plurality of events simultaneously, the sound emission control section 188 controls the characteristics of the sounds of notification according to the information on the priority levels of the event signals that correspond to the respective events. For example, assume that the engine temperature rises above a predetermined temperature and it is necessary to notify the engine overheat by emitting an alarm sound while notifying that the fuel level is low by emitting another alarm sound. In this case, if it is determined that the urgency or the significance of the engine overheat is higher because the fuel is still remaining, the two alarm sounds are so controlled and emitted that the localized sound image of the sound notifying the engine overheat is perceived by the driver as closer to the driver.

More specifically, when a sensor detects that the fuel level is low, the sensor section 110 acquires a detection signal from the sensor and generates an event signal that represents the fuel level is low in a state that corresponds to the described information relating to the predetermined priority level and outputs the generated event signal to the processing section 180. As the sound emission control section 188 acquirers this event signal, it also acquires the MIDI message for notifying the fuel level from the MIDI sound source generating section 187. Further, the sound emission control section 188 sets the parameter of the MIDI message so as to put the localized sound image is located substantially at the center relative to the driver and converts it into an analog signal so as to output it to the sound emitting section 150 as sound information. By acquiring the sound information, the sound emitting section 150 emits the acquired pieces of sound information from the speakers.

If the sensor section 110 recognizes the engine temperature rises above a predetermined temperature level based on the detection signal from the sensor detecting the engine temperature and outputs the event signal to the processing section 180 while notifying that the volume of the fuel remaining in the fuel tank falls below a permissible level. The sound emission control section 188 acquired the MIDI message notifying the engine overheat from the MIDI sound source generation section 187. Then, the sound emission control section 188 compares the priority level of the event signal of the low fuel level currently provided and that of the event signal relating to the engine overheat on the basis of the information on the priority levels. If the sound emission control section 188 determines that the priority level of the event signal relating to the engine overheat is higher, it modifies the parameter of the MIDI message corresponding to the event signal relating to the fuel level so as to move the localized sound image of the alarm sound thereof to the left, to the right or to a recessed position or thin it and the parameter of the MIDI message corresponding to the event signal relating to the engine overheat so as to move the localized sound image of the alarm sound thereof substantially to the front of the driver. Note that two or all of the control method of thinning the existence of a localized sound image, the control method of moving a localized sound image and the control method of moving the depth of a localized sound image may appropriately be combined for defining the parameters.

If, on the other hand, the sound emission control section 188 determines that the priority level of the event signal relating to the fuel level is higher than that of the event signal relating to the engine overheat on the basis of the information on the priority levels, it does not modify the parameters relating to the MIDI message for the fuel level for which a sound notification is being provided because the parameter of the MIDI message is adapted to bring the localized sound image of the notifying sound approximately to the center relative to the driver. Then, the section 188 modifies the parameter of the MIDI message corresponding to the event signal relating to the engine overheat so as to move the localized sound image of the alarm sound thereof to the left, to the right or to a recessed position or thin it. If, finally, the sound emission control section 188 determines that the priority level of the event signal relating to the fuel level is equal to that of the event signal relating to the engine overheat, it defines both of the parameters so as for the driver to perceive the two localized sound images substantially at equidistant positions from the driver. For example, the sound emission control section 188 may define both of the parameters so as to move the two localized sound images substantially to the center relative to the driver or to move one of the localized sound images to the right of the driver and the other localized sound image to the left of the driver.

The sound emission control section 188 transforms the MIDI messages whose parameters have been modified appropriately into analog signals and outputs them to the sound emitting section 150 for the purpose of emitting pieces of sound information for notification. Then, the sound emitting section 150 emits the acquired pieces of sound information from the speakers. When hearing the emitted sounds, the driver can perceive the sound notifying the event having a higher priority level as sharper sound and the localized sound image thereof closer to the driver due to the characteristics of the sound so that he or she, whichever appropriate, can recognize that the notification of the sound has a higher priority level of urgency or significance. Thus, the driver can judge which event is more urgent or significant due to the characteristics of each of the sounds notifying the respective events so that driver can drive the vehicle in a satisfactory manner.

When some other event to be notified occurs, the priority level of the event signal of the event is compared with that of the event signal relating to the fuel level and that of the event signal relating to the engine overheat that are being notified. Then, the parameters relating to the MIDI messages that correspond to the respective event signals are modified in such a way that the localized sound image of the sound of the MIDI message that corresponds to the event signal having the highest priority level is perceived substantially at the center and closest relative to the driver and the remaining localized sound images are perceived at positions displaced upward, downward, leftward or rightward or as thinned as a function of the priority level. Thereafter, the MIDI messages are transformed respectively into analog signals and transmitted to the sound emitting section 150 for the purpose of appropriately emitting pieces of sound information for notification.

[Advantages of Navigation Device]

As described above in detail, with the above-described embodiment, as a plurality of event signals that reflect the travel situations of the vehicle are output from the sensor section 110 according to the detection signals corresponding to the events relating to the travel of the vehicle and detected by the various sensors, the emitted sounds are so controlled that the localized sound image of the sound having the highest priority level for the related travel situation to be notified is perceived to be closest to the driver on the basis of the information showing the priority levels indicated by the respective event signals. Thus, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty. Then, the driver can drive the vehicle in a satisfactory manner.

Additionally, when a plurality of travel situations are notified, the sound image localizations are differentiated depending on the priority level of each of the travel situations in terms of urgency or significance so as to by turn differentiate the characteristics of the sounds heard by the driver in terms of sharpness and hence the driver can judge which travel situation is more urgent or significant and adapt to the travel situations being notified without difficulty.

Furthermore, when a plurality of travel situations are notified, the notifying operation is so controlled that the localized sound image of the sound notifying an event having a higher priority level is perceived by the driver so as to be closer to the driver. Thus, the driver can judge which travel situation is more urgent or significant even when a plurality of travel situations are notified. Additionally, the characteristics of the sound can be controlled as a function of the priority level by defining the parameters relating to the papots of MIDI messages or some other simple control technique to a great advantage of simplification of arrangement. Still additionally, the localized sound image of a notifying sound having a higher priority level is moved to a position substantially at the center relative to the driver to a great advantage of easily of control. More specifically, the localized sound image is moved to the left or right by appropriately defining the parameter value of the Panpot of a MIDI message. Thus, the characteristics of a notifying sound can be controlled according to the priority level in a simple manner to reduce the load of the processing necessary for the control so that the processing can be carried out at high speed and the overall configuration of the system can be simplified. Particularly, since a localized sound image that can be easily differentiated from other localized sound images is moved leftward or rightward, the user can satisfactorily recognize the priority level so that the user can reliably adapt to the travel situations.

Furthermore, the localized sound image for an event having a higher priority level can be so controlled as to move forwardly or backwardly relative to the driver and hence change the depth of the localized sound image. With this arrangement, it is easy to control the characteristics of the sound as a function of the priority level by moving the localized sound image. The sound pressure level is relatively changed when controlling and shifting the depth of the localized sound image. More specifically, the parameter value relating to the channel volume of the MIDI message is appropriately defined to control the operation of changing the depth of the localized sound image. With this arrangement, it is possible to control the characteristics of the sound so as to correspond to the priority level in a simple manner to consequently reduce the load of the processing necessary for the control so that the processing can be carried out at high speed and the overall configuration of the system can be simplified.

Additionally, a technique of thinning the existence of the localized sound image in response to a fall of the priority level is used to control and bring the localized sound image closer to the driver as a function of the priority level. With this arrangement, it is easy to control the characteristics of the sound by shifting the localized sound image as a function of the priority level. As the technique of thinning the existence of the localized sound image, the emission of an alarm sound is controlled by appropriately controlling and defining, for example, the relationship between the highest sound pressure level and the time to the highest sound pressure level so as to make the inclination from the start of sound emission to the highest sound pressure level of the envelope of the sound pressure level from the start to the end of sound emission from each of the speakers as shown in FIG. 5 show a steep gradient. With this arrangement, when a plurality of travel situations are notified, the driver can easily judge the urgency of the significance of each of the travel situations and can control the characteristics of each of the sounds by shifting the localized sound image thereof as a function of the priority level.

MIDI messages are used to control the operation of thinning the existence of the localized sound image and the parameter value of the corresponding MIDI message is defined appropriately as a function of the priority level of the event to be notified. More specifically, as described above, the parameter value for the attack time is defined so as to make the attack time short as a function of the priority level without modifying the parameter for the attack level. With this arrangement, the localized sound image can be shifted by a simple control operation of modifying the parameter value to consequently reduce the load of the processing necessary for the control so that the processing can be carried out at high speed and the overall configuration of the system can be simplified. Additionally, since the parameter value for the attack time is modified without modifying the parameter value for the attack level, the control process can be further simplified to consequently further reduce the load of the processing necessary for the control so that the processing can be carried out at high speed and the overall configuration of the system can be simplified.

Furthermore, the characteristics of the alarm sound to be emitted is so controlled that the inclination of the envelope as shown in FIG. 5 from the command for stopping the sound emission (note off) to the point where the sound pressure level substantially comes to 0 to terminate the sound emission shows a steep gradient as a function of the priority level of the event to be notified. Thus, the driver can easily and clearly hear the alarm sound when the localized sound image thereof is shifted relative to the driver so that he or she can easily judge the travel situations of the vehicle. Then, the driver can drive the vehicle in a satisfactory manner.

It is possible to control the characteristics of an alarm sound whose localized sound image changes as a function of the priority level of the event to be notified by the sound by appropriately selecting the time and the sound pressure level to control and make the inclination from the note off to the point where the sound pressure level substantially comes to 0 to terminate the sound emission. In other words, the parameter value for the release time of a MIDI message that conforms to the MIDI Standard is defined on the basis of the sustain level that is the minimum value of the decay level. More specifically, the parameter value is defined so as to make shorten the release time. With this arrangement, the localized sound image of a sound can be controlled simply by modifying the parameter value to consequently reduce the load of the processing necessary for the control so that the processing can be carried out at high speed and the overall configuration of the system can be simplified. Further, since the parameter value for the release time is modified without modifying the parameter value corresponding to the sustain level, the control process can be simplified to consequently further reduce the load of the processing necessary for the control so that the processing can be carried out at high speed and the overall configuration of the system can be simplified.

Particularly, when MIDI protocol control conforming to the XG Standard or the GM Level 2 Standard where parameter values that reflect the attack time and the release time are used, it is only necessary to modify the corresponding parameter values to reduce the load of the processing necessary for the control so that the processing can be carried out at high speed and the overall configuration of the system can be simplified.

On the other hand, for thinning a localized sound image, a notification having a lower priority level is temporarily erased so that an event having a higher priority level may be clearly recognized. In other words, the driver can clearly recognize a notification having a higher priority in terms of urgency or significance. More specifically, as described above the parameter for defining the note off of a MIDI message or the parameter for defining the off velocity of a MIDI message is modified. With this arrangement, travel situations having different priority levels can be notified appropriately by means of a simple control process.

Particularly, as a specific control for making the localized sound image having a higher priority level closer relative to the driver, the difference among localized sound images can be recognized clearly and the priorities of different travel situations can be notified clearly by appropriately combining the control method of thinning the existence of a localized sound image, the control method of shifting a localized sound image and the control method of changing the depth of a localized sound image. As a result, the driver can adapt to the travel situations being notified without difficulty. Then, the driver can drive the vehicle in a satisfactory manner.

Additionally, a travel support device for notifying the situations of events according to the present invention is embodied as a navigation device. Thus, the driver can hear alarm sounds with different priority levels of urgency or significant as messages of notifications under circumstances where a plurality of events can take place depending on the travel situations of the vehicle. In other words, travel situations can be notified appropriately by controlling the characteristics of alarm sounds. Then, the driver can drive the vehicle in a satisfactory manner.

Additionally, the processing section 180 is typically realized by a program using the CPU (Central Processing Unit) or the like. In other words, the characteristics of sounds can be controlled appropriately as a function of the priority level of notification. This arrangement can extend the scope of application of the present invention. The characteristics of sounds can be controlled with ease when the program is recorded in a recording medium so as to be read by a computer. Then, the program can be handled with ease to further extend the scope of application of the present invention. The operating section according to the present invention is not limited to a single computer. Alternatively, it may be realized by combining a plurality of computers to form a network, by a single element such as a CPU or a microcomputer or by a circuit board on which a plurality of electronic parts are mounted.

An alarm sound to be used for notifying a travel situation for the purpose of the present invention carries a small amount of information as sound information and the characteristics of the alarm sound are controlled appropriately. In other words, the characteristics of the sound can be controlled simply by modifying the corresponding parameter and the situation of an event can be notified to the driver with its priority level to consequently reduce the load of the processing necessary for the control so that the processing can be carried out at high speed and the configuration of the system can be simplified. Additionally, when a voice is output corresponding to an alarm sound, the driver can recognize the event that is notified firstly by an alarm sound and subsequently by a voice with its priority level to realize an excellent notification if the characteristics of the sound are not controlled.

Modifications to Embodiment

The present invention is by no means limited to the above-described embodiment, which may be modified as described below within the scope of the present invention.

While the present invention is described above by way of the navigation device 100 for providing guidance for a moving vehicle, events that are used for the purpose of the present invention are not limited to travel situations of a vehicle and the notification control device according to the present invention may be realized in the form of an alarm clock for notifying a clock time as event, a manufacturing situation notifying device or an alarm device for notifying a manufacturing situation as event. In other words, the notification control device according to the present invention is adapted to control the characteristics of the sound to be emitted from a speaker in order to notify an event. The notification control device according to the present invention is not limited to the navigation device 100 that utilizes map information but may be so arranged as to notify the state of a vehicle as situations for the travel of the vehicle such as the fuel level, the engine overheat, the distance between a vehicle and the vehicle moving immediately before the first vehicle. Such a device may be mounted separately from the navigation device 100 in a vehicle.

Travel situations for the purpose of the present invention are not limited to those of a vehicle but may be those of any other mobile body such as an aircraft or a ship. Furthermore, a mobile body may be a user who carries a terminal device by way of which the travel situations are notified. Additionally, the notification control device according to the present invention may be carried directly by the user. Thus, it may be realized as a mobile phone or a PHS (Personal Handyphone System) with which the travel situations are detected by using a network or some other communication system. Networks used for the purpose of the present invention include, for example, Internet based on a general purpose protocol such as TCP/IP, intranets, LANs (local area networks), communication networks including a plurality of base stations that can transmit and receive information by way of radio mediums and broadcasting networks as well as radio mediums such as electric waves, light, sound waves, electromagnetic waves and so on that operate as mediums for directly transmitting/receiving information.

While many of the functional features described above are realized by a program, they may alternatively be realized by hardware such as a circuit board or a single IC (Integrated Circuit). However, the use of a program that is read from a separate recording medium provides an advantage of easy handle, which is essential for expanding the scope of utilization.

While an alarm sound is emitted to notify a travel situation and the characteristics of the alarm sound are controlled in the above description, it may alternatively be so arranged that the characteristics of the voice for notification are directly controlled, for example, without emitting the alarm sound. In other words, not only sounds conforming to the MIDI Standard but also any sound sources such as FM sound sources and PCM sound sources may be utilized for sound information for the purpose of the present invention. Then, the characteristics of a sound can be controlled in a relatively simple manner when they are controlled by means of a control method using the MIDI protocol to consequently reduce the load of the processing necessary for the control so that the processing can be carried out at high speed and the configuration of the system can be simplified. Additionally, not only the technique of appropriately defining the parameter value of a MIDI message but also any other techniques for analog processing or digital processing may be used for the purpose of the present invention such as the technique of controlling the envelope by means of an electric circuit so as to make it show a predetermined inclination. Still additionally, the advantages of the present invention can be obtained if a single sound source is used for notifying a plurality of events by way of different channels of MIDI message or if different sound sources are used for respective events.

To control a localized sound image so as to make it appear as if it approaches the driver as its priority level rises, it may be so arranged that the direct sound gradually increases relative to the position of the driver by controlling the ratio of the direct sound to the reflected sound. The ratio of the direct sound to the reflected sound can be controlled with ease typically by using a highly directional speaker, for example. More specifically, the directional speaker is controlled so as to increase its directivity to the driver as the priority level of the sound emitted from it is raised. However, the ratio of the direct sound to the reflected sound can be controlled by any other technique without using a directive speaker.

While a MIDI message that provides a tone matching the event to be notified is acquired from the MIDI sound source generating section 187 and the parameter value of the MIDI message is modified by the sound emission control section 188 in the above description, it may alternatively be so arranged that the sound emission control section 188 controls the MIDI sound source generating section 187 so as to generate a MIDI message with a parameter value that corresponds to the priority level of the event to be notified and cause the sound emitting section 150 to emit the generated MIDI message. This arrangement provides advantages similar to those described above.

The parameter values of MIDI message are appropriately modified when a plurality of events are notified in the above description. However, when a single event is to be notified, it may be alternatively be so arranged that the localized sound image of the sound for notifying the event approaches the driver by modifying the parameter value of the corresponding MIDI message when the event changes its priority level with time in terms of urgency or significant as in the case, for example, where the distance between the vehicle and the obstacle behind the vehicle is gradually reduced as the vehicle moves back. Similar arrangements may be combined when a number of events are to be notified and their respective priority levels change with time. Then, the travel situations of the vehicle can be notified highly accurately and appropriately.

Figure 15:
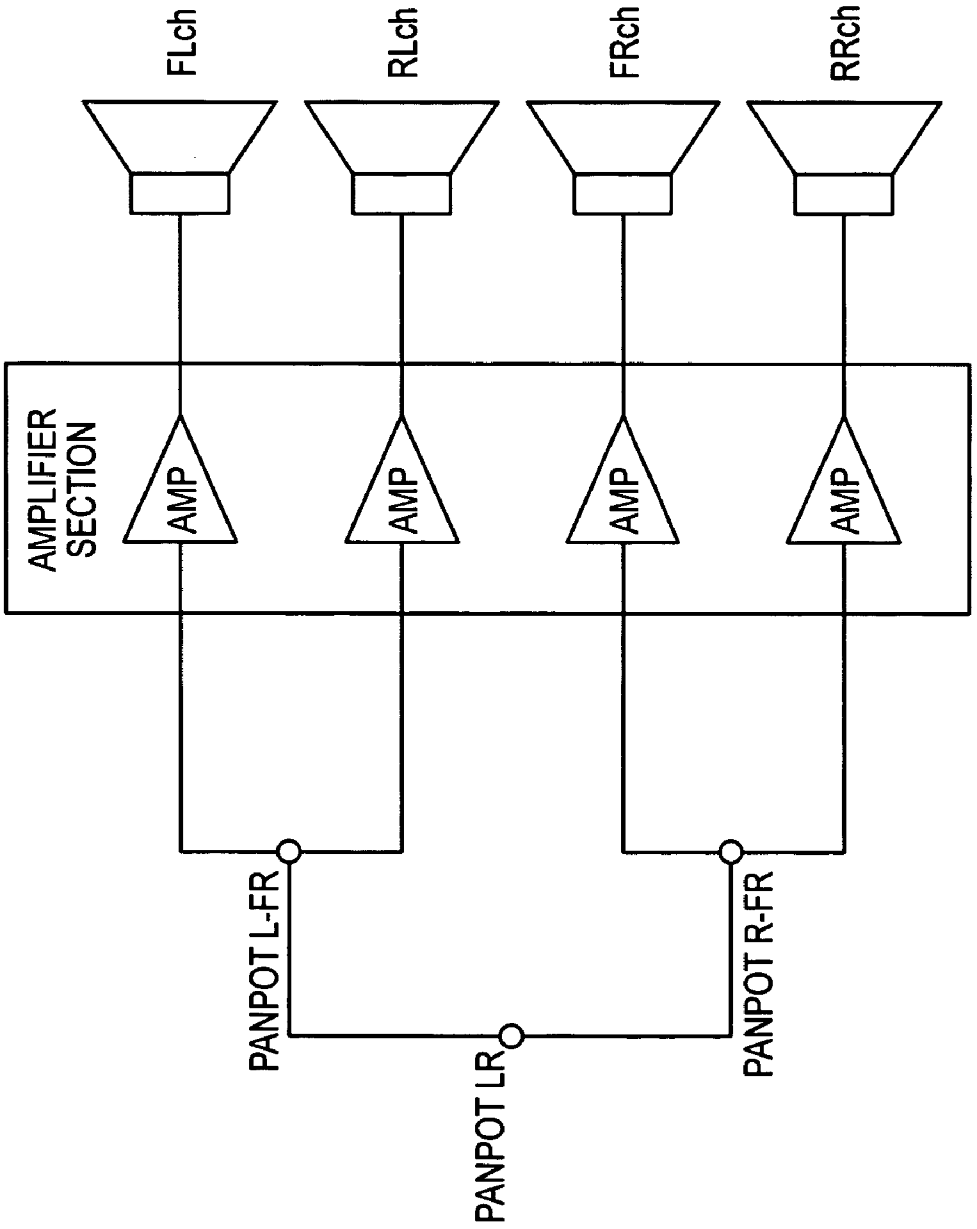
FIG. 15 is a schematic block diagram illustrating the structure for controlling of moving a localized sound image by a Panpot of a MIDI message of a navigation device as a travel support device according to the present invention.

To move a localized sound image, the parameter value of the Panpot may be additionally defined so as to move the corresponding sound left or right while each of the remaining sounds is moved forward or backward by utilizing a DSP (Digital Signal Processor). Still alternatively, the first sound may be moved diagonally in a direction while the remaining sounds are moved in the opposite direction. The localized sound image may be moved only by using a DSP. More specifically, a localized sound image can be moved by appropriately controlling the delay time, the frequency characteristics, the phase and the sound pressure level of the sound information to be emitted. Additionally, a localized sound image can be moved leftward or rightward (Panpot LR) and the sound components thereof can be moved forward or backward (Panpot L-FR, Panpot R-FR) along the left and right channels by selecting an appropriate value for the parameter of the Panpot as shown in FIG. 15. With this arrangement, it is possible to shift a localized sound image forward, backward, leftward or backward only by defining the parameter value of the Panpot without using a DSP.

Additionally, the above-described embodiment can be modified in terms of specific configuration and procedure without departing from the scope of the present invention.

Other Embodiment

The above embodiment is described in terms of emphasizing an event having a higher priority level in situations where a number of events occur simultaneously. On the other hand, the present invention can be used to provide a technique of clearly indicating the urgency level of each event in situations where a number of events having different priority levels do not occur simultaneously but may occur sequentially.

Now, such an embodiment will be described below.

The operation of the navigation device 100 and that of the processing section 180 of this embodiment are identical with those of the above-described embodiment. On the other hand, the operation of the sound emitting section 150 for providing sound guidance proceeds in a manner as described below.

At the time when the sound emitting section 150 emits sounds to provide guidance, the sound emission control section 188 controls the characteristics of the sounds on the basis of the priority levels of the notifications to be made in terms of urgency or significance. Thus, the characteristics of the sounds are controlled on the basis of the priority levels of the detected event signals in terms of urgency or significance. For example, when guidance is provided in voice to notify the user of a corner and the angle of the corner and an alarm sound has to be emitted to notify an event that constitutes an obstacle having a high priority level of urgency or significant for the travel of the vehicle such as that the fuel level is very low or that the distance between the vehicle of the user and the vehicle moving immediately before it has become shorter than a predetermined value, the characteristics of the sound of the notification are so controlled that the localized sound image of the sound approaches the driver.

More specifically, the sound emission control section 188 recognizes the event signals that are output from the sensor section 110 as the latter detects and recognizes the travel situations of the vehicle, or the events. Then, the sound emission control section 188 acquires MIDI messages relating to the alarm sounds that correspond to the respective events, from the MIDI sound source generating section. Additionally, the sound emission control section 188 recognizes the priority level of each of the event signals from the information relating to the priority levels thereof that is contained in the event signal.

When the priority level of an event signal is not high in terms of urgency or significance, the parameter value of the corresponding MIDI message is so defined as to control the characteristics of the sound to be emitted in such a way that the inclination of the envelope illustrated in FIG. 5 from the start of sound emission to the highest sound pressure level shows a mild gradient and the inclination representing the relationship between the release time and the sustain level also shows a mild gradient. When, on the other hand, the priority level is high, the parameter value of the corresponding MIDI message is so defined as to control the characteristics of the sound to be emitted in such a way that the inclination of the envelop from the start of sound emission to the highest sound pressure level shows a steep gradient and the inclination representing the relation between the release time and the sustain level also shows a steep gradient correspondingly.

More specifically, the inclination of the envelope from the start of sound emission to the highest sound pressure level as illustrated in FIG. 5 is controlled in a manner as described below. Namely, if a MIDI message conforming to the XG Standard or the GM level 2 Standard is used the control method will be such that the value of format "dd" at address cc#73 of the control change is gradually shifted from 127 toward 0 as shown in FIG. 6. If a MIDI message conforming to the GS Standards is used, a NRPN (Non-Registered Parameter Number) will be specified. More specifically, the parameter to be operated is identified by means of NRPN MSB and NRPN LSB and an arrangement for shifting the value of cc#6 of the data entry of LSB and MSB approach 0 as illustrated in FIGS. 7 and 8 is made. Additionally, the format "cc# 11" for expressing the control change is defined as substitute parameter conforming to the GS Standard as shown in FIG. 9 in order to reduce the period for selecting a maximum sound pressure level stepwise.

Furthermore, the inclination representing the relationship between the value of the release time and that of the sustain level of the envelope of FIG. 5 is controlled in a manner as described below. In the case of a MIDI message conforming to the XG standard or the GM Level 2 Standard, for example, the value of format "dd" at address cc#72 of the control change is modified so as to gradually approach 0 from 127 as shown in FIG. 10. On the other hand, in the case of a MIDI message conforming to the GS Standard, "I" and "102" are selected respectively as cc#99 for the MSB of NRPN and as cc#98 for the LSB of NRPN and making an arrangement for shifting the value of cc#6 of the data entry to approach 0 as in the case of the attack time.

Then, the sound emission control section 188 converts the MIDI message having a parameter of a predetermined value defined in a manner as described above into an analog signal and outputs it to the sound emitting section 150 as sound information to be notified. Thereafter, the sound emitting section 150 outputs the acquired sound information to the speaker so as to emit it as alarm sound. Additionally, when the sound emission control section 188 outputs a voice data in response to an event, it acquires the voice data corresponding to the event from the storage section 160 or the memory 170 and converts it into an analog signal so as to output it from the sound emitting section 150 as voice.

Due to such sound emission, the driver can perceive that the alarm sound representing an event to be notified becomes sharper when the priority level of the event increases. Then, the localized sound image of the alarm sound is heard as if it were approaching so that the driver can recognize that the urgency or significance level is increasing. Thus, the attention of the driver to the event is improved as its priority level rises so that the driver will more consciously and carefully recognize the event. Therefore, the driver can easily judge the urgency or significance level of the travel situations of the vehicle and hence reliably recognize the travel situations of the vehicle.

[Advantages of Other Embodiment]

As described above, with the above-described other embodiment, the sensor section 110 outputs event signals that correspond to the respective travel situations of the vehicle as detected by the various sensors and relate to the travel of the vehicle and an alarm sound is emitted for each travel situation and controlled in such a way that the inclination of the envelope shown in FIG. 5 of the sound pressure level from the start of sound emission to the highest sound pressure level is made to show a steep gradient as the priority level of the event to be notified rises on the basis of information showing the priority level and contained in the event signal. With this arrangement, the alarm sound is heard by the driver in such a way that its localized sound image approaches the driver as the priority level of the travel situation to be notified increase in terms of urgency or significance. Then, the attention of the driver to the travel situation being notified to the driver is improved as its priority level rises in terms of urgency or significance so that the driver will more and more consciously and carefully recognize the travel situation. Therefore, the driver can easily judge the travel situations of the vehicle and hence the driver can drive the vehicle in a satisfactory manner.

Additionally, to control the inclination of the envelope from the start of sound emission to the highest sound pressure level as shown in FIG. 5, the time from the start of sound emission to the highest sound pressure level is appropriately defined and controlled without modifying the value of the maximum sound pressure level. Therefore, the localized sound image of each alarm sound can be controlled and modified relative to the driver by a simple control operation of defining a predetermined parameter value such as the attack time of the corresponding MIDI message so that the overall configuration of the system can be simplified.

A MIDI message that is sound information conforming to the MIDI Standard is utilized as alarm sound and the characteristics of the sound are controlled by appropriately defining an appropriate parameter value for the MIDI message as a function of the priority level of the event to be notified by it. With this arrangement, it is possible to control the characteristics of the sound by a simple control method so that the overall configuration of the system can be simplified. Additionally, a MIDI sound source having a small quantity of data is utilized to consequently reduce the load of the processing necessary for the control so that the processing can be carried out at high speed and the overall configuration of the system for controlling the characteristics of sounds can be simplified.

Still additionally, the parameter value of the MIDI message is so defined as to reduce the attack time as a function of the priority level by appropriately defining the parameter value of the attack time without modifying the parameter corresponding to the attack level. With this arrangement, it is possible to control and shift the localized sound image by simply modifying the parameter value to consequently reduce the load of the processing necessary for the control so that the processing can be carried out at high speed and the overall configuration of the system for controlling the characteristics of sounds can be simplified. With this arrangement, additionally, it is possible to further simplify the control process because the parameter value of the attack time is modified without modifying the parameter corresponding to the attack level to consequently reduce the load of the processing necessary for the control so that the processing can be carried out at high speed and the overall configuration of the system for controlling the characteristics of sounds can be simplified.

Furthermore, the characteristics of the alarm sound to be emitted is so controlled that the inclination of the envelope as shown in FIG. 5 from the command for stopping the sound emission (note off) to the point where the sound pressure level substantially comes to 0 to terminate the sound emission shows a steep gradient as a function of the priority level of the event to be notified. Thus, the driver can easily and clearly hear the alarm sound when the localized sound image thereof is shifted relative to the driver so that he or she can easily judge the travel situations of the vehicle. Then, the driver can drive the vehicle in a satisfactory manner.

It is possible to control the characteristics of an alarm sound whose localized sound image changes as a function of the priority level of the event to be notified by the sound by appropriately selecting the time and the sound pressure level to control and make the inclination from the note off to the point where the sound pressure level substantially comes to 0 to terminate the sound emission. In other words, the parameter value for the release time of a MIDI message that conforms to the MIDI Standard is defined on the basis of the sustain level that is the minimum value of the decay level. More specifically, the parameter value is defined so as to make shorten the release time. With this arrangement, the localized sound image of a sound can be controlled simply by modifying the parameter value to consequently reduce the load of the processing necessary for the control so that the processing can be carried out at high speed and the overall configuration of the system can be simplified. Further, since the parameter value for the release time is modified without modifying the parameter value corresponding to the sustain level, the control process can be further simplified to consequently further reduce the load of the processing necessary for the control so that the processing can be carried out at high speed and the overall configuration of the system can be simplified.

The priority applications Number JP2003-427509 and JP2003-427510 upon which this patent application is based are hereby incorporated by reference.

What is claimed is:

1. A notification control device for notifying a situation of an event by controlling characteristics of a sound emitted from a speaker based on the event, the device comprising:
- a control section for controlling an inclination from a start of sound emission to the highest sound pressure level of an envelope of a sound pressure level from the start to an end of the sound emission from the speaker so as to show a steep gradient as a priority level of notifying the situation of an input event becomes higher based on an event signal representing the priority level of notification of the situation of the event.

2. The notification control device according to claim 1, wherein the control section defines the inclination from the start of sound emission to the highest sound pressure level of the envelope by means of a time from the start of the sound emission to the highest sound pressure level and the sound pressure level.

3. A notification control device for notifying a situation of an event by controlling characteristics of a sound emitted from a speaker based on the event, the device comprising:
- a control section for modifying either a time from a start of sound emission to the highest sound pressure level of an envelope of a sound pressure level from the start to an end of the sound emission from the speaker or the sound pressure level corresponding to an event signal corresponding to the situation of an input event.

4. A notification control device for notifying a situation of an event by controlling characteristics of a sound emitted from a speaker based on the event, the device comprising:
- an event signal acquiring section for acquiring an event signal corresponding to the situation of the event;
- a sound information generating section for generating sound information to be emitted from the speaker; and
- a sound emission control section for modifying a time and a sound pressure level of the sound information in a region from a start of sound emission to the highest sound pressure level of an envelope of a sound pressure level from the start to an end of the sound emission from the speaker corresponding to the acquired event signal.

5. The notification control device according to claim 4, wherein the sound emission control section causes the sound information generating section to generate sound information by defining the time and the sound pressure level in the region from the start to the highest sound pressure level of the envelope corresponding to the event signal acquired by means of the event signal acquiring section.

6. A notification control device for notifying a situation of an event by controlling characteristics of a sound emitted from a speaker based on the event, the device comprising:
- an event signal acquiring section for acquiring an event signal corresponding to the situation of the event; and
- a sound information generating section for generating sound information to be emitted from the speaker, defining information on a time and a sound pressure level in a region from a start of sound emission to the highest sound pressure level of an envelope of the sound pressure level from the start to an end of the sound emission from the speaker corresponding to the acquired event signal.

7. The notification control device according to claim 3, wherein the time and the sound pressure level are defined so as to produce a state where a steepness of an inclination of the envelope from the start of sound emission to the highest sound pressure level increases as a priority level of situation information showing a priority of notifying the event situation of the event signal becomes higher.

8. The notification control device according to claim 4, wherein the time and the sound pressure level are defined so as to produce a state where a steepness of an inclination of the envelope from the start of sound emission to the highest sound pressure level increases as a priority level of situation information showing a priority of notifying the event situation of the event signal becomes higher.

9. The notification control device according to claim 6, wherein the time and the sound pressure level are defined so as to produce a state where a steepness of an inclination of the envelope from the start of sound emission to the highest sound pressure level increases as a priority level of situation information showing a priority of notifying the event situation of the event signal becomes higher.

10. The notification control device according to claim 1, wherein the inclination of the envelope from a command for stopping the sound emission from the speaker to the end of the sound emission when the sound pressure level substantially becomes 0 is so controlled that its gradient becomes steep as the priority level of the event signal representing the priority level of notification of the situation of the event becomes higher.

11. The notification control device according to claim 3, wherein inclination of the envelope from a command for stopping the sound emission from the speaker to the end of the sound emission when the sound pressure level substantially becomes 0 is so controlled that its gradient becomes steep as a priority level of the event signal representing a priority level of notification of the situation of the event becomes higher.

12. The notification control device according to claim 4, wherein inclination of the envelope from a command for stopping the sound emission from the speaker to the end of sound emission when the sound pressure level substantially becomes 0 is so controlled that its gradient becomes steep as a priority level of the event signal representing a priority level of notification of the situation of the event becomes higher.

13. The notification control device according to claim 6, wherein the inclination of the envelope from a command for stopping the sound emission from the speaker to the end of the sound emission when the sound pressure level substantially becomes 0 is so controlled that its gradient becomes steep as a priority level of the event signal representing a priority level of notification of the situation of the event becomes higher.

14. The notification control device according to claim 1, wherein a time and the sound pressure level from a command for stopping the sound emission from the speaker to the end of sound emission when the sound pressure level substantially becomes 0 are defined based on the event signal.

15. The notification control device according to claim 3, wherein the time the sound pressure level from a command for stopping the sound emission from the speaker to the end of sound emission when the sound pressure level substantially becomes 0 and are defined based on the event signal.

16. The notification control device according to claim 4, wherein the time and a sound pressure level from a command for stopping the sound emission from the speaker to the end of sound emission when the sound pressure level substantially becomes 0 are defined based on the event signal.

17. The notification control device according to claim 6, wherein the time and the sound pressure level from a command for stopping the sound emission from the speaker to the end of sound emission when the sound pressure level substantially becomes 0 are defined based on the event signal.

18. The notification control device according to claim 14, wherein, at least either a level value of attack level information relating to an attack level or a time value of the attack time information relating to an attack time of sound information conforming to a MIDI Standard is defined.

19. The notification control device according to claim 15, wherein, at least either the level value of attack level information relating to an attack level or a time value of the attack time information relating to an attack time of sound information conforming to a MIDI Standard is defined.

20. The notification control device according to claim 16, wherein, at least either the level value of attack level information relating to an attack level or a time value of the attack time information relating to an attack time of sound information conforming to a MIDI Standard is defined.

21. The notification control device according to claim 17, wherein, at least either the level value of attack level information relating to an attack level or a time value of the attack time information relating to an attack time of sound information conforming to a MIDI Standard is defined.

22. The notification control device according to claim 10, wherein a time value of decay time information relating to a release time and a level value of the decay level information relating to a decay level of sound information conforming to a MIDI Standard are defined.

23. The notification control device according to claim 11, wherein a time value of decay time information relating to a release time and a level value of the decay level information relating to a decay level of sound information conforming to a MIDI Standard are defined.

24. The notification control device according to claim 12, wherein a time value of decay time information relating to a release time and a level value of the decay level information relating to a decay level of sound information conforming to a MIDI Standard are defined.

25. The notification control device according to claim 13, wherein a time value of decay time information relating to a release time and a level value of the decay level information relating to a decay level of sound information conforming to a MIDI Standard are defined.

26. The notification control device according to claim 14, wherein a time value of decay time information relating to a release time and a level value of the decay level information relating to a decay level of sound information conforming to a MIDI Standard are defined.

27. The notification control device according to claim 15, wherein a time value of decay time information relating to a release time and a level value of the decay level information relating to a decay level of the sound information conforming to a MIDI Standard are defined.

28. The notification control device according to claim 16, wherein a time value of decay time information relating to a release time and a level value of the decay level information relating to a decay level of sound information conforming to a MIDI Standard are defined.

29. The notification control device according to claim 17, wherein a time value of decay time information relating to a release time and a level value of the decay level information relating to a decay level of sound information conforming to a MIDI Standard are defined.

30. A notification control device for notifying a situation of an event by controlling characteristics of a sound emitted from a speaker arranged around a reference point based on the event, the device comprising:

a control section for, based on an event signal representing a priority level of notifying the situation of the input event, controlling so as to raise a ratio of a direct sound to a reflected sound reaching the reference point due to the emission of sound by the speaker as the priority level becomes higher.

31. The notification control device according to claim 30, wherein the speaker is a directional speaker, and the control section controls the ratio of the direct sound to the reflected sound by controlling a directivity of the directional speaker.

32. A notification control device for notifying situations of a plurality of different events by controlling characteristics of a sound emitted from a speaker arranged around a reference point based on the events, the device comprising:

a control section for, based on a plurality of event signals each representing a priority level of notification of each of the situations of the input events, controlling notification so as to bring a localized sound image for one the events having the highest priority level of notification to be closest relative to the reference point in terms of a relative distance.

33. The notification control device according to claim 32, wherein the control section controls so as to bring the localized sound image to be closer to the position of the reference point as the priority level becomes higher.

34. A notification control device for notifying situations of a plurality of different events by controlling characteristics of a sound emitted from a speaker arranged around a reference point based on the events, the device comprising:

a control section for, based on a plurality of event signals each representing a priority level of notification of each of the situations of the input events, controlling the sound emitted from the speaker so as to bring a localized sound image of an event having a higher priority level of notification to be closer relative to the reference point.

35. The notification control device according to claim 33, wherein the control section controls so as to produce a state where the localized sound image comes closer to a substantially front position relative to the position of the reference point as the priority level becomes higher.

36. The notification control device according to claim 34, wherein the control section controls so as to produce a state where the localized sound image comes closer to a substantially front position relative to the position of the reference point as the priority level becomes higher.

37. The notification control device according to claim 33, wherein the control section controls so as to produce a state where the distance relative to the position of the reference point in front thereof becomes shorter as the priority level becomes higher.

38. The notification control device according to claim 34, wherein the control section controls so as to produce a state where the distance relative to the position of the reference point in front thereof becomes shorter as the priority level becomes higher.

39. The notification control device according to claim 33, wherein the control section controls so as to relatively raise a sound pressure level of the sound emitted from the speaker as the priority level becomes higher.

40. The notification control device according to claim 34, wherein the control section controls so as to relatively raise a sound pressure level of the sound emitted from the speaker as the priority level becomes higher.

41. The notification control device according to claim 33, wherein the control section controls so as to produce a state where a steepness of the inclination of an envelope from a start of sound emission to the highest sound pressure level increases as the priority level becomes higher.

42. The notification control device according to claim 34, wherein the control section controls so as to produce a state where a steepness of the inclination of an envelope from a start of sound emission to the highest sound pressure level increases as the priority level becomes higher.

43. A notification control device for notifying situations of a plurality of different events by controlling characteristics of a sound emitted from a speaker arranged around a reference point based on the events, the device comprising:

- an event signal acquiring section adapted to acquire a plurality of event signals corresponding to the situations of the events;
- a sound information generating section for generating sound information to be emitted from the speaker; and
- a sound emission control section for recognizing a priority level of each of the acquired plurality of event signals and controlling the sound emitted from the speaker so as to bring a localized sound image of an event having a higher priority level closer relative to the reference point.

44. The notification control device according to claim 43, wherein the sound emission control section controls so as to modify the localized sound image as a function of an increase or decrease of a sound pressure level of the sound emitted from the speaker.

45. A notification control device for notifying situations of a plurality of different events by controlling characteristics of a sound emitted from speaker arranged around a reference point based on the events, the device comprising:

- an event signal acquiring section for acquiring a plurality of event signals corresponding to the situations of the events; and
- a sound information generating section for recognizing a priority level of each of the plurality of event signals and generating sound information, defining information relating to sound image localizations so as to bring a localized sound image of an event having a higher priority level to be closer relative to the reference point for the sound information emitted from the speaker.

46. The notification control device according to claim 32, wherein the localized sound image is modified by modifying a specified value of panpot information of sound information conforming to a MIDI Standard.

47. The notification control device according to claim 34, wherein the localized sound image is modified by modifying a specified value of panpot information of sound information conforming to a MIDI Standard.

48. The notification control device according to claim 43, wherein the localized sound image is modified by modifying a specified value of panpot information of the sound information conforming to a MIDI Standard.

49. The notification control device according to claim 45, wherein the localized sound image is modified by modifying a specified value of panpot information of the sound information conforming to a MIDI Standard.

50. The notification control device according to claim 32, wherein the localized sound image is modified by modifying at least any one of velocity information, volume information and expression information of sound information conforming to a MIDI Standard.

51. The notification control device according to claim 34, wherein the localized sound image is modified by modifying at least any one of velocity information, volume information and expression information of sound information conforming to a MIDI Standard.

52. The notification control device according to claim 43, wherein the localized sound image is modified by modifying at least any one of velocity information, volume information and expression information of the sound information conforming to a MIDI Standard.

53. The notification control device according to claim 45, wherein the localized sound image is modified by modifying at least any one of velocity information, volume information and expression information of the sound information conforming to a MIDI Standard.

54. The notification control device according to claim 32, wherein the characteristics of the sounds emitted from the speaker are controlled by modifying at least either a level value of attack level information relating to an attack level or a time value of attack time information relating to an attack time of sound information conforming to a MIDI Standard.

55. The notification control device according to claim 34, wherein the characteristics of the sounds emitted from the speaker are controlled by modifying at least either a level value of attack level information relating to an attack level or a time value of attack time information relating to an attack time of sound information conforming to a MIDI Standard.

56. The notification control device according to claim 43, wherein the characteristics of the sounds emitted from the speaker are controlled by modifying at least either a level value of attack level information relating to an attack level or a time value of attack time information relating to an attack time of sound information conforming to a MIDI Standard.

57. The notification control device according to claim 45, wherein the characteristics of the sounds emitted from the speaker are controlled by modifying at least either a level value of attack level information relating to an attack level or a time value of attack time information relating to an attack time of sound information conforming to a MIDI Standard.

58. A notification control device for notifying situations of a plurality of different events by controlling characteristics of a sound emitted from a speaker arranged around a reference point based on the events, the device comprising:

- an event signal acquiring section for acquiring a plurality of event signals corresponding to the situations of the events;
- a sound information generating section for generating sound information to be emitted from the speaker; and
- a sound emission control section for recognizing a priority level of each of the acquired plurality of event signals and controlling a time and a sound pressure level from a start of a sound emission to the highest sound pressure level so as to make an inclination from the start of the sound emission to the highest sound pressure level of an envelope of the sound pressure level from the start to an end of the sound emission from each of the speaker show a steep gradient as the priority level becomes higher.

59. The notification control device according to claim 58, wherein the sound information is emitted from the speaker by modifying the inclination from the start of the sound emission to the highest sound pressure level by modifying a level value of attack level information relating to an attack level and a time value of attack time information relating to an attack time of the sound information conforming to a MIDI Standard.

60. A notification control device for notifying situations of a plurality of different events by controlling characteristics of a sound emitted from a speaker arranged around a reference point based on the events, the device comprising:

a control section for, based on event signals representing respectively priority level of notification of the situations of the input events, controlling so as to relatively raise a ratio of a direct sound to a reflected sound reaching a reference point due to the sound emission by the speaker as the priority level of notification becomes higher.

61. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

a control section for controlling an inclination from a start of sound emission to the highest sound pressure level of an envelope of a sound pressure level from the start to an end of the sound emission from the speaker so as to show a steep gradient as a priority level of notifying the situation of the input event becomes higher based on an event signal representing the priority level of notification of the situation of the event.

62. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

a control section for modifying either a time from a start of sound emission to the highest sound pressure level of an envelope of a sound pressure level from the start to an end of the sound emission from the speaker or the sound pressure level corresponding to an event signal corresponding to the situation of the input event.

63. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

an event signal acquiring section for acquiring an event signal corresponding to the situation of the event;

a sound information generating section for generating sound information to be emitted from the speaker; and a sound emission control section for modifying a time and a sound pressure level of the sound information in a region from a start of sound emission to the highest sound pressure level of an envelope of a sound pressure level from the start to an end of the sound emission from the speaker corresponding to the acquired event signal.

64. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

an event signal acquiring section for acquiring an event signal corresponding to the situation of the event; and a sound information generating section for generating sound information to be emitted from the speaker, defining information on a time and a sound pressure level in a region from the start of sound emission to the highest sound pressure level of an envelope of the sound pressure level from the start to an end of the sound emission from the speaker corresponding to the acquired event signal.

65. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

a control section for, based on a plurality of event signals each representing a priority level of a notification of the situations of the input events, controlling notification so as to bring a localized sound image for one of the events having the highest priority level of notification to be closest relative to the reference point in terms of a relative distance.

66. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

a control section for, based on a plurality of event signals each representing a priority level of a notification of the situations of the input events, controlling the sound emitted from the speaker so as to bring a localized sound image of an event having a higher priority level of notification to be closer relative to the reference point.

67. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

an event signal acquiring section adapted to acquire a plurality of event signals corresponding to the situations of the events;

a sound information generating section for generating sound information to be emitted from the speaker; and a sound emission control section for recognizing a priority level of each of the acquired plurality of event signals and controlling the sound emitted from the speaker so as to bring a localized sound image of an event having a higher priority level to be closer relative to the reference point.

68. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

an event signal acquiring section for acquiring a plurality of event signals each corresponding to the situation of the event; and a sound information generating section for recognizing a priority level of each of the plurality of event signals and generating sound information, defining information relating to sound image localizations so as to bring a localized sound image of an event having a higher priority level to be closer relative to the reference point for the sound information emitted from the speaker.

69. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as the situation of an event by emitting a sound from a speaker based on information on the situation, the notification control device comprising:

an event signal acquiring section for acquiring a plurality of event signals each corresponding to the situation of the event; and a sound information generating section for generating sound information to be emitted from the speaker; and a sound emission control section for recognizing a priority level of each of the acquired plurality of event signals and controlling a time and a sound pressure level from a start of a sound emission to the highest sound pressure level so as to make an inclination from the start of the sound emission to the highest sound pressure level of an envelope of the sound pressure level from the start to an end of the sound emission from each of the speaker show a steep gradient as the priority level becomes higher.

70. A travel support device for supporting a travel of a mobile body by notifying a travel situation of the mobile body based on map information, the device comprising:

a travel situation acquiring section for acquiring information on the travel situation on the travel of the mobile body; and a notification control device for notifying a guidance relating to the travel as a situation of an event by emitting a sound from a speaker based on information on the situation, the notification control device comprising:

a control section for, based on event signals each representing a priority level of notification of the situations of the input events, controlling so as to relatively raise a ratio of a direct sound to a reflected sound reaching a reference point due to the sound emission by the speaker as the priority level of notification becomes higher.

71. A notification control system comprising:

a plurality of event situation detecting sections respectively for detecting a situation of event and outputting an event signal corresponding to the situation of event;

a priority level judging section for judging a priority level of the event based on the event signal; and a notification control device for notifying the situation of event by controlling characteristics of a sound emitted from a speaker based on the judged priority level, the notification control device comprising:

a control section for controlling an inclination from a start of sound emission to the highest sound pressure level of an envelope of a sound pressure level from the start to an end of the sound emission from the speaker so as to show a steep gradient as a priority level of notifying the situation of an input event becomes higher based on an event signal representing the priority level of notification of the situation of the event.

72. A notification control system comprising:

a plurality of event situation detecting sections respectively for detecting a situation of event and outputting an event signal corresponding to the situation of event;

a priority level judging section for judging a priority level of the event based the event signal; and a notification control device for notifying the situation of event by controlling characteristics of a sound emitted from a speaker based on the judged priority level, the notification control device comprising:

a control section for modifying either a time from a start of sound emission to the highest sound pressure level of an envelope of a sound pressure level from the start to an end of the sound emission from the speaker or a sound pressure level corresponding to an event signal corresponding to the situation of an input event.

73. A notification control system comprising:

a plurality of event situation detecting sections respectively for detecting a situation of event and outputting an event signal corresponding to the situation of event;

a priority level judging section for judging a priority level of the event based on the event signal; and a notification control device for notifying the situation of event by controlling characteristics of a sound emitted from a speaker based on the judged priority level, the notification control device comprising:

an event signal acquiring section for acquiring the event signal corresponding to the situation of the event;

a sound information generating section for generating sound information to be emitted from the speaker; and a sound emission control section for modifying a time and a sound pressure level of the sound information in a region from a start of sound emission to the highest sound pressure level of an envelope of a sound pressure level from the start to an end of the sound emission from the speaker corresponding to the acquired event signal.

74. A notification control system comprising:

a plurality of event situation detecting sections respectively for detecting a situation of event and outputting an event signal corresponding to the situation of event;

a priority level judging section for judging a priority level of the event based on the event signal; and a notification control device for notifying situation of event by controlling characteristics of a sound emitted from a speaker based on the judged priority level, the notification control device comprising:

an event signal acquiring section for acquiring the event signal corresponding to the situation of the event; and a sound information generating section for generating sound information to be emitted from the speaker, defining information on a time and a sound pressure level in a region from a start of sound emission to the highest sound pressure level of an envelope of the sound pressure level from the start to an end of the sound emission from the speaker corresponding to the acquired event signal.

75. A notification control system comprising:

a plurality of event situation detecting sections for detecting situations of events and outputting event signals corresponding to the situations of events;

a priority level judging section for judging the priority level of each of the events based on the event signals; and a notification control device for notifying the situations of events by controlling the characteristics of a sound emitted from a speaker based on the judged priority levels, the notification control device comprising:

a control section for, based on the plurality of event signals each representing a priority level of notification of each of the situations of the input events, controlling notification so as to bring a localized sound image for one the events having the highest priority level of notification to be closest relative to the reference point in terms of a relative distance.

76. A notification control system comprising:

a plurality of event situation detecting sections for detecting situations of events and outputting event signals corresponding to the situations of events;

a priority level judging section for judging the priority level of each of the events based on the event signals; and a notification control device for notifying the situations of events by controlling the characteristics of a sound emitted from a speaker based on the judged priority levels, the notification control device comprising:

a control section for, based on a plurality of event signals each representing a priority level of notification of each of the situations of the input events, controlling the sounds emitted from the speaker so as to bring a localized sound image of an event having a higher priority level of notification to be closer relative to the reference point.

77. A notification control system comprising:

a plurality of event situation detecting sections for detecting situations of events and outputting a plurality of event signals corresponding to the situations of events;

a priority level judging section for judging a priority level of each of the events based on the event signals; and a notification control device for notifying the situations of events by controlling characteristics of a sound emitted from a speaker based on the judged priority levels, the notification control device comprising:

an event signal acquiring section adapted to acquire the plurality of event signals corresponding to the situations of the events;

a sound information generating section for generating sound information to be emitted from the speaker; and a sound emission control section for recognizing a priority level of each of the acquired plurality of event signals and controlling the sound emitted from the speaker so as to bring a localized sound image of an event having a higher priority level to be closer relative to a reference point.

78. A notification control system comprising:

a plurality of event situation detecting sections for detecting situations of events and outputting a plurality of event signals corresponding to the situations of events;

a priority level judging section for judging a priority level of each of the events based on the event signals; and a notification control device for notifying the situations of events by controlling characteristics of a sound emitted from a speaker based on the judged priority levels, the notification control device comprising:

an event signal acquiring section for acquiring the plurality of event signals corresponding to the situations of the events; and a sound information generating section for recognizing a priority level of each of the plurality of event signals and generating sound information, defining information relating to sound image localizations so as to bring a localized sound image of an event having a higher priority level to be closer relative to a reference point for the sound information emitted from the speaker.

79. A notification control system comprising:

a plurality of event situation detecting sections for detecting situations of events and outputting a plurality of event signals corresponding to the situations of events;

a priority level judging section for judging a priority level of each of the events based on the event signals; and a notification control device for notifying the situations of events by controlling characteristics of a sound emitted from a speaker based on the judged priority levels, the notification control device comprising:

an event signal acquiring section for acquiring the plurality of event signals corresponding to the situations of the events;

a sound information generating section for generating sound information to be emitted from the speaker; and a sound emission control section for recognizing a priority level of each of the acquired plurality of event signals and controlling a time and a sound pressure level from a start of a sound emission to the highest sound pressure level so as to make an inclination from the start of the sound emission to the highest sound pressure level of an envelope of the sound pressure level from the start to an end of the sound emission from each of the speaker show a steep gradient as the priority level becomes higher.

80. A notification control system comprising:

a plurality of event situation detecting sections respectively for detecting a situation of event and outputting an event signal corresponding to the situation of event;

a priority level judging section for judging a priority level of each of the events based on the event signal; and a notification control device for notifying the situation of event by controlling characteristics of a sound emitted from a speaker based on the judged priority level.

the notification control device comprising:

a control section for, based on the event signal representing a priority level of notification of the situation of the input event, controlling so as to relatively raise a ratio of a direct sound to a reflected sound reaching a reference point due to the sound emission by the speaker as the priority level of notification becomes higher.

81. A notification control system comprising:

a plurality of event situation detecting sections respectively for detecting a situation of event and outputting an event signal corresponding to the situation of event;

a priority level judging section for judging a priority level of the event based on the event signal;

a notification control device for notifying the situation of event by controlling the characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as the situation of an event by emitting a sound from a speaker based on information on the situation, the notification control device comprising:

a control section for controlling an inclination from a start of sound emission to the highest sound pressure level of an envelope of a sound pressure level from the start to an end of the sound emission from the speaker so as to show a steep gradient as a priority level of notifying the situation of the input event becomes higher based on an event signal representing the priority level of notification of the situation of the event.

82. A notification control system comprising:

a plurality of event situation detecting sections respectively for detecting a situation of event and outputting an event signal corresponding to the situation of event;

a priority level judging section for judging a priority level of the event based on the event signal;

a notification control device for notifying the situation of event by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on information on the situation, the notification control device comprising:

a control section for modifying either a time from a start of sound emission to the highest sound pressure level of an envelope of a sound pressure level from the start to an end of the sound emission from the speaker or the sound pressure level corresponding to an event signal corresponding to the situation of the input event.

83. A notification control system comprising:

a plurality of event situation detecting sections respectively for detecting a situation of event and outputting an event signal corresponding to the situation of event;

a priority level judging section for judging a priority level of the event based on the event signal;

a notification control device for notifying the situation of event by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on information on the situation, the notification control device comprising:

an event signal acquiring section for acquiring the event signal corresponding to the situation of the event;

a sound information generating section for generating sound information to be emitted from the speaker; and a sound emission control section for modifying a time and a sound pressure level of the sound information in a region from a start of sound emission to the highest sound pressure level of an envelope of a sound pressure level from the start to an end of the sound emission from the speaker corresponding to the acquired event signal.

84. A notification control system comprising:

a plurality of event situation detecting sections respectively for detecting a situation of event and outputting an event signal corresponding to the situation of event;

a priority level judging section for judging a priority level of each of the events based on the event signal;

a notification control device for notifying the situation of event by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on information on the situation, the notification control device comprising:

an event signal acquiring section for acquiring the event signal corresponding to the situation of the event; and a sound information generating section for generating sound information to be emitted from the speaker, defining information on a time and a sound pressure level in a region from the start of sound emission to the highest sound pressure level of an envelope of the sound pressure level from the start to an end of the sound emission from the speaker corresponding to the acquired event signal.

85. A notification control system comprising:

a plurality of event situation detecting sections for detecting situations of events and outputting event signals corresponding to the situations of events;

a priority level judging section for judging a priority level of each of the events based on the event signals;

a notification control device for notifying the situations of events by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on the information on the situation, the notification control device comprising:

a control section for, based on a plurality of event signals each representing a priority level of a notification of the situations of the input events, controlling notifications so as to bring a localized sound image for one of the events having the highest priority level of notification to be closest relative to a reference point in terms of a relative distance.

86. A notification control system comprising:

a plurality of event situation detecting sections for detecting situations of events and outputting event signals corresponding to the situations of events;

a priority level judging section for judging a priority level of each of the events based on the event signals;

a notification control device for notifying the situations of events by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on information on the situation, the notification control device comprising:

a control section for, based on a plurality of event signals each representing a priority level of a notification of the situations of the input events, controlling the sound emitted from the speaker so as to bring a localized sound image of one of the events having a higher priority level of notification to be closer relative to a reference point.

87. A notification control system comprising:

a plurality of event situation detecting sections respectively for detecting a situation of event and outputting an event signal corresponding to the situation of event;

a priority level judging section for judging a priority level of the event based on the event signal;

a notification control device for notifying the situation of event by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on information on the situation, the notification control device comprising:

an event signal acquiring section adapted to acquire a plurality of event signals corresponding to the situations of the events;

a sound information generating section for generating sound information to be emitted from the speaker; and a sound emission control section for recognizing a priority level of each of the acquired plurality of event signals and controlling the sound emitted from the speaker so as to bring a localized sound image of the event having a higher priority level to be closer relative to the reference point.

88. A notification control system comprising:

a plurality of event situation detecting sections for detecting situations of events and outputting a plurality of event signals corresponding to the situations of events;

a priority level judging section for judging a priority level of each of the events based on the event signals;

a notification control device for notifying the situations of events by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as a situation of an event by emitting a sound from a speaker based on information on the situation, the notification control device comprising:

an event signal acquiring section for acquiring the plurality of event signals corresponding to the situations of the events; and a sound information generating section for recognizing a priority level of each of the plurality of event signals and generating sound information, defining information relating to sound image localizations so as to bring a localized sound image of one of the events having a higher priority level to be closer relative to a reference point for the sound information emitted from the speaker.

89. A notification control system comprising:

a plurality of event situation detecting sections for detecting situations of events and outputting a plurality of event signals corresponding to the situations of events;

a priority level judging section for judging a priority level of each of the events based on the event signals;

a notification control device for notifying the situations of events by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as the situation of the event by emitting a sound from a speaker based on information on the situation, the notification control device comprising:

an event signal acquiring section for acquiring the plurality of event signals corresponding to the situations of the events;

a sound information generating section for generating sound information to be emitted from the speaker; and a sound emission control section for recognizing a priority level of each of the acquired plurality of event signals and controlling a time and a sound pressure level from a start of a sound emission to the highest sound pressure level so as to make an inclination from the start of the sound emission to the highest sound pressure level of an envelope of the sound pressure level from the start to an end of the sound emission from the speaker show a steep gradient as the priority level becomes higher.

90. A notification control system comprising:

a plurality of event situation detecting sections for detecting situations of events and outputting a plurality of event signals corresponding to the situations of events;

a priority level judging section for judging a priority level of each of the events based on the event signals;

a notification control device for notifying the situations of events by controlling characteristics of a sound emitted from a speaker based on the judged priority level; and a travel support device comprising:

a travel situation acquiring section for acquiring information on a travel situation on a travel of a mobile body; and a notification control device for notifying a guidance relating to the travel as the situation of the event by emitting a sound from a speaker based on information on the situation, the notification control device comprising:

a control section for, based on the event signals respectively representing priority level of notification of the situations of the input events, controlling so as to relatively raise a ratio of a direct sound to a reflected sound reaching a reference point due to the sound emission by the speaker as the priority level of notification becomes higher.

91. A notification control method of notifying a situation of an event by controlling characteristics of a sound emitted from a speaker by an operating section based on the event, the method comprising:

controlling an inclination from a start of sound emission to the highest sound pressure level of an envelope of a sound pressure level from the start to an end of the sound emission from the speaker so as to show a steep gradient as a priority level of notifying the situation of the input event becomes higher based on an event signal representing the priority level of notification of the situation of the event.

92. A notification control method of notifying a situation of an event by controlling the characteristics of a sound emitted from a speaker by an operating section based on the event, the method comprising:

modifying a time from a start of sound emission to the highest sound pressure level of an envelope of a sound pressure level from the start to an end of the sound emission from the speaker and the sound pressure level corresponding to an event signal corresponding to the situation of the input event.

93. A notification control method of notifying a situation of an event by controlling the characteristics of a sound emitted from a speaker by an operating section based on the event, the method comprising:

acquiring an event signal corresponding to the situation of the event; and modifying a time and a sound pressure level of sound information to be emitted from the speaker in a region from a start of sound emission to the highest sound pressure level of an envelope of the sound pressure level from the start to an end of the sound emission from the speaker corresponding to the acquired event signal.

94. A notification control method of notifying a situation of an event by controlling characteristics of a sound emitted from a speaker by an operating section based on the event, the method comprising:

acquiring an event signal corresponding to a situation of the event;

generating sound information to be emitted from the speaker, defining information on a time and a sound pressure level in a region from a start of sound emission to the highest sound pressure level of an envelope of the sound pressure level from the start to an end of the sound emission from the speaker; and emitting the generated sound information from the speaker.

95. A notification control method of notifying a situation of an event by controlling characteristics of a sound emitted from a speaker arranged around a reference point by an operating section based on the event:

the operating section controlling so as to raise a ratio of a direct sound to a reflected sound reaching a reference point due to the emission of the sound by the speaker as a priority level of notification becomes higher based on an event signal representing the priority level of notifying the situation of the input event.

96. A notification control method of notifying situations of a plurality of events by controlling characteristics of a sound emitted from a speaker arranged around a reference point by an operating section based on the events:

the operating section controlling, based on a plurality of event signals representing a priority level of notification of the situations of the input events, notification so as to bring a localized sound image of one of the events having the highest priority level of notification to be the closest relative to a reference point in terms of relative distance.

97. A notification control method of notifying situations of a plurality of events by controlling characteristics of a sound emitted from a speaker arranged around a reference point by an operating section based on the events:

the operating section controlling, based on a plurality of event signals representing respectively priority levels of notification of the situations of the input events, so as to bring a localized sound image of one of the events having a higher priority level of notification to be closer relative to the reference point.

98. A notification control method of notifying situations of a plurality of events by processing sound information emitted from a speaker arranged around a reference point by an operating section based on the events:

the operating section controlling, based on a plurality of event signals respectively representing priority levels of notification of the situations of the input events and emit the sound information from the speaker, so as to process the sound information in order to bring a localized sound image of one of the events having a higher priority level of notification to be closer relative to the reference point.

99. A notification control method of notifying situations of a plurality of events by controlling characteristics of a sound emitted from a speaker arranged around a reference point by an operating section based on the events:

the operating section recognizing a priority level of each of a plurality of different event signals corresponding to the situations of the events and generating sound information to be emitted from the speaker so as to bring a localized sound image having a higher priority level to be closer relative to the reference point.

100. A notification control method of notifying situations of a plurality of events by controlling characteristics of a sound emitted from a plurality of speakers arranged around a reference point by an operating section based on the events:

the operating section recognizing a priority level of each of a plurality of different event signals corresponding to the situations of the events and controlling a time from a start of sound emission to the highest sound pressure level and a sound pressure level in a state where an inclination from the start of sound emission to the highest sound pressure level of an envelope of the sound pressure level from the start to an end of the sound emission from the speaker is made to show a steep gradient as the priority level becomes higher.

101. A notification control method of notifying situations of a plurality of events by controlling characteristics of a sound emitted from a plurality of speakers arranged around a reference point by an operating section based on the events:

the operating section controlling, based on event signals each representing a priority level of notifying the situations of the input events, so as to relatively raise a ratio of a direct sound to a reflected sound reaching a reference point due to the sound emission by each of the speakers as the priority level of notification becomes higher.

102. A notification control program for causing an operating section to function as a notification control device, the notification control device for notifying a situation of an event by controlling characteristics of a sound emitted from a speaker based on the event, the device comprising:

a control section for controlling an inclination from a start of sound emission to the highest sound pressure level of an envelope of a sound pressure level from the start to an end of the sound emission from the speaker so as to show a steep gradient as a priority level of notifying the situation of an input event becomes higher based on an event signal representing the priority level of notification of the situation of the event.

103. A notification control program for causing an operating section to function as a notification control device, the notification control device for notifying a situation of an event by controlling characteristics of a sound emitted from a speaker based on the event, the device comprising:

a control section for modifying either a time from a start of sound emission to the highest sound pressure level of an envelope of a sound pressure level from the start to an end of the sound emission from the speaker or a sound pressure level corresponding to an event signal corresponding to the situation of an input event.

104. A notification control program for causing an operating section to function as a notification control device, the notification control device for notifying a situation of an event by controlling characteristics of a sound emitted from a speaker based on the event, the device comprising:

an event signal acquiring section for acquiring an event signal corresponding to the situation of the event;

a sound information generating section for generating sound information to be emitted from the speaker; and a sound emission control section for modifying a time and a sound pressure level of the sound information in a region from a start of sound emission to the highest sound pressure level of an envelope of a sound pressure level from the start to an end of the sound emission from the speaker corresponding to the acquired event signal.

105. A notification control program for causing an operating section to function as a notification control device, the notification control device for notifying a situation of an event by controlling characteristics of a sound emitted from a speaker based on the event, the device comprising:

an event signal acquiring section for acquiring an event signal corresponding to the situation of the event; and a sound information generating section for generating sound information to be emitted from the speaker, defining information on a time and a sound pressure level in a region from a start of sound emission to the highest sound pressure level of an envelope of the sound pressure level from the start to an end of the sound emission from the speaker corresponding to the acquired event signal.

106. A notification control program for causing an operating section to function as a notification control device, the notification control device for notifying situations of a plurality of different events by controlling characteristics of a sound emitted from a speaker arranged around a reference point based on the events, the device comprising:

a control section for, based on a plurality of event signals each representing a priority level of notification of each of the situations of the input events, controlling notification so as to bring a localized sound image for one the events having the highest priority level of notification to be closest relative to the reference point in terms of a relative distance.

107. A notification control program for causing an operating section to function as a notification control device, the notification control device for notifying situations of a plurality of different events by controlling characteristics of a sound emitted from a speaker arranged around a reference point based on the events, the device comprising:

a control section for, based on a plurality of event signals each representing a priority level of notification of each of the situations of the input events, controlling the sounds emitted from the speaker so as to bring a localized sound image of one of the events having a higher priority level of notification closer relative to the reference point.

108. A notification control program for causing an operating section to function as a notification control device, the notification control device for notifying situations of a plurality of different events by controlling characteristics of a sound emitted from a speaker arranged around a reference point based on the events, the device comprising:

an event signal acquiring section adapted to acquire a plurality of event signals corresponding to the situations of the events;

a sound information generating section for generating sound information to be emitted from the speaker; and a sound emission control section for recognizing a priority level of each of the acquired plurality of event signals and controlling the sound emitted from the speaker so as to bring a localized sound image of an event having a higher priority level to be closer relative to the reference point.

109. A notification control program for causing an operating section to function as a notification control device, the notification control device for notifying situations of a plurality of different events by controlling characteristics of a sound emitted from speaker arranged around a reference point based on the events, the device comprising:

an event signal acquiring section for acquiring a plurality of event signals corresponding to the situations of the events; and a sound information generating section for recognizing priority level of each of the plurality of event signals and generating sound information, defining information relating to sound image localizations so as to bring a localized sound image of an event having a higher priority level to be closer relative to the reference point for the sound information emitted from the speaker.

110. A notification control program for causing an operating section to function as a notification control device, the notification control device for notifying situations of a plurality of different events by controlling characteristics of a sound emitted from a speaker arranged around a reference point based on the events, the device comprising:

an event signal acquiring section for acquiring a plurality of event signals corresponding to the situations of the events;

a sound information generating section for generating sound information to be emitted from the speaker; and a sound emission control section for recognizing a priority level of each of the acquired plurality of event signals and controlling a time and a sound pressure level from a start of a sound emission to the highest sound pressure level so as to make an inclination from the start of the sound emission to the highest sound pressure level of an envelope of the sound pressure level from the start to an end of the sound emission from each of the speaker show a steep gradient as the priority level becomes higher.

111. A notification control program for causing an operating section to function as a notification control device, the notification control device for notifying situations of a plurality of different events by controlling characteristics of a sound emitted from speaker arranged around a reference point based on the events, the device comprising:

a control section for, based on event signals representing respectively priority level of notification of the situations of the input events, controlling so as to relatively raise a ratio of a direct sound to a reflected sound reaching a reference point due to the sound emission by the speaker as the priority level of notification becomes higher.

* * * * *